(12) United States Patent
Ko et al.

(10) Patent No.: US 11,989,017 B2
(45) Date of Patent: May 21, 2024

(54) STATION APPARATUS AND MOVING ROBOT SYSTEM

(71) Applicant: LG Electronics Inc., Seoul (KR)

(72) Inventors: Kyoungsuk Ko, Seoul (KR); Byungjin Kim, Seoul (KR); Sungwook Lee, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 17/266,481

(22) PCT Filed: Aug. 5, 2019

(86) PCT No.: PCT/KR2019/009702
§ 371 (c)(1),
(2) Date: Feb. 5, 2021

(87) PCT Pub. No.: WO2020/032501
PCT Pub. Date: Feb. 13, 2020

(65) Prior Publication Data
US 2021/0302967 A1 Sep. 30, 2021

Related U.S. Application Data

(60) Provisional application No. 62/714,746, filed on Aug. 5, 2018.

(30) Foreign Application Priority Data

Jul. 10, 2019 (KR) ........................ 10-2019-0083393

(51) Int. Cl.
*G05D 1/00* (2006.01)
*A01D 34/00* (2006.01)
(Continued)

(52) U.S. Cl.
CPC ............ *G05D 1/0022* (2013.01); *B60L 53/36* (2019.02); *B60L 53/66* (2019.02); *G05D 1/0016* (2013.01);
(Continued)

(58) Field of Classification Search
CPC . A01D 34/008; A01D 2101/00; B25J 9/1664; B25J 11/008; B25J 13/006;
(Continued)

(56) References Cited

U.S. PATENT DOCUMENTS

| 6,764,373 B1 | 7/2004 | Osawa et al. |
| 8,433,468 B2 | 4/2013 | Johnson et al. |

(Continued)

FOREIGN PATENT DOCUMENTS

| CN | 106171248 A | 12/2016 |
| DE | 102015218225 A1 | 4/2016 |

(Continued)

OTHER PUBLICATIONS

Li, Zengke et al., "An Approach to Improve the Positioning Performance of GPS/INS/UWB Integrated System with Two-Step Filter", Remote Sensing Journal 2018, 10, 19; (14 pgs.).

(Continued)

*Primary Examiner* — Jason Holloway
*Assistant Examiner* — Blake A Wood
(74) *Attorney, Agent, or Firm* — Birch, Stewart, Kolasch & Birch, LLP

(57) ABSTRACT

The present disclosure relates to a station apparatus, including an Ultra-wideband (UWB) module to receive a first UWB signal transmitted by a moving robot, and a control unit to calculate a reception angle of the first UWB signal upon the reception of the first UWB signal, and control the UWB module to transmit a second UWB signal, including (Continued)

a direction value determined based on the reception angle, to the moving robot for return of the moving robot.

9 Claims, 10 Drawing Sheets

(51) Int. Cl.
| | | |
|---|---|---|
| A01D 101/00 | (2006.01) | |
| B60L 53/36 | (2019.01) | |
| B60L 53/66 | (2019.01) | |
| G01S 5/02 | (2010.01) | |
| H01Q 1/27 | (2006.01) | |
| H01Q 3/22 | (2006.01) | |

(52) U.S. Cl.
CPC ......... *G05D 1/0088* (2013.01); *G05D 1/0214* (2013.01); *G05D 1/0219* (2013.01); *G05D 1/0225* (2013.01); *G05D 1/028* (2013.01); *G05D 1/0295* (2013.01); *H01Q 1/27* (2013.01); *H01Q 3/22* (2013.01); *A01D 34/008* (2013.01); *A01D 2101/00* (2013.01); *B60L 2260/32* (2013.01); *G01S 5/0284* (2013.01)

(58) Field of Classification Search
CPC ........ B60L 53/30; B60L 53/305; B60L 53/36; B60L 53/66; B60L 2200/40; B60L 2260/32; G01S 3/043; G01S 3/48; G01S 5/0284; G01S 5/12; G01S 13/765; G01S 13/878; G05D 1/0016; G05D 1/0022; G05D 1/0088; G05D 1/0214; G05D 1/0219; G05D 1/0225; G05D 1/0246; G05D 1/0276; G05D 1/028; G05D 1/0295; G05D 2201/0208; H01Q 1/2291; H01Q 1/27; H01Q 1/3233; H01Q 3/01; H01Q 3/02; H01Q 3/22; H01Q 3/24; H01Q 5/25; H01Q 21/061; H01Q 21/28; Y02T 10/70; Y02T 10/7072; Y02T 90/12; Y02T 90/16

See application file for complete search history.

(56) References Cited

U.S. PATENT DOCUMENTS

| | | | |
|---|---|---|---|
| 8,942,862 B2 | 1/2015 | Markusson et al. | |
| 8,996,171 B2 | 3/2015 | Anderson et al. | |
| 9,058,039 B2* | 6/2015 | Lee .................. | G05D 1/0272 |
| 9,471,063 B2 | 10/2016 | Ouyang | |
| 9,788,153 B1 | 10/2017 | Newstadt et al. | |
| 10,383,497 B2 | 8/2019 | Han et al. | |
| 2006/0238159 A1 | 10/2006 | Jung | |
| 2009/0043462 A1 | 2/2009 | Stratton et al. | |
| 2010/0168934 A1 | 7/2010 | Ball et al. | |
| 2011/0237274 A1* | 9/2011 | Wong .................. | H04W 4/026 |
| | | | 455/566 |
| 2012/0293371 A1 | 11/2012 | Lu | |
| 2013/0025248 A1 | 1/2013 | Kraft et al. | |
| 2013/0041526 A1 | 2/2013 | Ouyang | |
| 2013/0218397 A1 | 8/2013 | Griffini et al. | |
| 2014/0196967 A1 | 7/2014 | Chang et al. | |
| 2015/0328775 A1 | 11/2015 | Shamlian et al. | |
| 2015/0366129 A1 | 12/2015 | Borinato | |
| 2016/0026185 A1 | 1/2016 | Smith et al. | |
| 2016/0059875 A1 | 3/2016 | Segman et al. | |
| 2016/0174459 A1 | 6/2016 | Balutis et al. | |
| 2016/0334800 A1 | 11/2016 | Han et al. | |
| 2016/0363933 A1 | 12/2016 | Balutis et al. | |
| 2016/0366818 A1 | 12/2016 | Shamlian et al. | |
| 2016/0377688 A1 | 12/2016 | Kleiner et al. | |
| 2016/0379164 A1 | 12/2016 | Li | |
| 2017/0026818 A1 | 1/2017 | Beaulieu et al. | |
| 2017/0039860 A1* | 2/2017 | Just ..................... | G01S 3/26 |
| 2017/0050659 A1 | 2/2017 | Cardano et al. | |
| 2017/0108860 A1 | 4/2017 | Doane et al. | |
| 2017/0127608 A1 | 5/2017 | Biber et al. | |
| 2017/0150676 A1 | 6/2017 | Yamauchi et al. | |
| 2017/0231452 A1 | 8/2017 | Saito et al. | |
| 2018/0081366 A1 | 3/2018 | Tan et al. | |
| 2018/0173223 A1 | 6/2018 | Doane et al. | |
| 2018/0267136 A1* | 9/2018 | Zhong ............... | G01S 3/42 |
| 2019/0025847 A1* | 1/2019 | Mannefred ........... | A47L 9/2894 |
| 2019/0053191 A1* | 2/2019 | Balappanavar ....... | H04W 4/44 |
| 2019/0208979 A1 | 7/2019 | Bassa et al. | |
| 2019/0212730 A1 | 7/2019 | Jones et al. | |
| 2019/0337155 A1 | 11/2019 | Kwak et al. | |
| 2020/0037498 A1 | 2/2020 | Ko et al. | |
| 2020/0037499 A1 | 2/2020 | Ko et al. | |
| 2020/0041601 A1 | 2/2020 | Ko et al. | |
| 2020/0212563 A1* | 7/2020 | Sakamoto ........... | H01Q 1/246 |
| 2021/0037703 A1 | 2/2021 | Holgersson | |

FOREIGN PATENT DOCUMENTS

| | | |
|---|---|---|
| EP | 3200040 A1 | 8/2017 |
| EP | 3 309 641 A1 | 4/2018 |
| FR | 3043304 A1 | 5/2017 |
| JP | 2006-236132 A | 9/2006 |
| JP | 2017-531423 A | 10/2017 |
| KR | 10-2001-0009583 A | 2/2001 |
| KR | 10-2004-0081629 A | 9/2004 |
| KR | 10-2006-0111780 A | 10/2006 |
| KR | 10-2007-0012119 A | 1/2007 |
| KR | 10-2007-0061218 | 6/2007 |
| KR | 10-2007-0109748 | 11/2007 |
| KR | 10-2008-0001003 A | 1/2008 |
| KR | 10-2009-0011418 A | 2/2009 |
| KR | 10-0902115 B1 | 6/2009 |
| KR | 10-2009-0076721 A | 7/2009 |
| KR | 10-2013-0014105 A | 2/2013 |
| KR | 10-2014-0066850 A | 6/2014 |
| KR | 10-2014-0073657 A | 6/2014 |
| KR | 10-2015-0125508 A | 11/2015 |
| KR | 10-2016-0026293 A | 3/2016 |
| KR | 10-2016-0063140 A | 6/2016 |
| KR | 10-2016-0128124 A | 11/2016 |
| KR | 10-2016-0133348 A | 11/2016 |
| KR | 10-2016-0136131 A | 11/2016 |
| KR | 10-2016-0149562 A | 12/2016 |
| KR | 10-2017-0073162 A | 6/2017 |
| KR | 10-1742913 | 6/2017 |
| KR | 10-2017-0082006 A | 7/2017 |
| KR | 10-2017-0082016 A | 7/2017 |
| KR | 10-2018-0038879 A | 4/2018 |
| KR | 10-2018-0069237 A | 6/2018 |
| KR | 10-2018-0085309 A | 7/2018 |
| WO | WO 03/104909 A1 | 12/2003 |
| WO | WO 2015/192902 A1 | 12/2015 |
| WO | WO 2016/097900 A1 | 6/2016 |
| WO | WO 2016/160376 A1 | 10/2016 |
| WO | WO 2017015554 A1 | 1/2017 |
| WO | WO 2018/108179 A1 | 6/2018 |

OTHER PUBLICATIONS

Leonard, John J. et al., "Mobile Robot Localization by Tracking Geometric Beacons", IEEE Transactions on Robotics and Automation, vol. 7, No. 3, Jun. 1991, 7 pages.
Korean Office Action in Application No. KR 10-2019-0068832 dated Jul. 30, 2020 (5 pages).
Korean Office Action in Application No. KR 10-2019-0050058 dated Nov. 16, 2020 (5 pages).
Korean Office Action in Application No. KR 10-2019-0012994 dated Jul. 25, 2020 (19 pages).
Korean Office Action in Application No. KR 10-2019-0012990 dated Jul. 9, 2020 (14 pages).
Korean Office Action in Application No. KR 10-2019-0012989 dated Jul. 9, 2020 (17 pages).

(56) References Cited

OTHER PUBLICATIONS

Examination Report No. 1 issued in related Australian Application No. AU 2019208265, dated May 6, 2020 (6 pgs.).
Examination Report No. 1 issued in related Australian Application No. AU 2019210641, dated Oct. 8, 2020 (7 pgs.).
European Extended Search Report issued in European Patent Application No. EP 19189646.3, dated Apr. 24, 2020 (10 pgs.).
Notice of Allowance received from the Korean Intellectual Property Office in Korean Application No. 10-2019-0050956, dated Jul. 19, 2021 (2 pages).
Notice of Allowance received from the Korean Intellectual Property Office in Korean Application No. 10-2019-0050959, dated May 27, 2021 (2 pages).
U.S. Appl. No. 16/526,314, filed Jul. 30, 2019, Kyoungsuk Ko et al.
U.S. Appl. No. 16/526,260, filed Jul. 30, 2019, Kyoungsuk Ko et al.
U.S. Appl. No. 16/531,222, filed Aug. 5, 2019, Kyoungsuk Ko et al.
U.S. Appl. No. 17/265,671, filed Feb. 3, 2021, Kyoungsuk Ko et al.
U.S. Appl. No. 17/265,590, filed Feb. 3, 2021, Kyoungsuk Ko et al.
U.S. Appl. No. 17/265,633, filed Feb. 3, 2021, Kyoungsuk Ko et al.
U.S. Appl. No. 17/265,613, filed Feb. 3, 2021, Kyoungsuk Ko et al.
U.S. Appl. No. 17/265,761, filed Feb. 3, 2021, Kyoungsuk Ko et al.
U.S. Appl. No. 17/266,457, filed Feb. 5, 2021, Kyoungsuk Ko et al.
Extended European Search Report, dated Jan. 18, 2022, issued in European Patent Application No. 21193991.3 (8 pages).
Notice of Allowance received from the Korean Intellectual Property Office in Korean Application No. 10-2019-0012989, dated Jan. 25, 2021 (2 pages).
Notice of Allowance received from the Korean Intellectual Property Office in Korean Application No. 10-2019-0012994, dated Mar. 22, 2021 (3 pages).

\* cited by examiner

STATION APPARATUS AND MOVING ROBOT SYSTEM

CROSS-REFERENCE TO RELATED APPLICATIONS

This application is a National Stage filing under 35 U.S.C. 371 of PCT International Application No. PCT/KR2019/009702, filed on Aug. 5, 2019, which claims the benefit of earlier filing date and right of priority under 35 U.S.C. 119(a) to U.S. Provisional Application No. 62/714,746 filed Aug. 5, 2018 and Korean Application No. 10-2019-0083393, filed on Jul. 10, 2019, the contents of which are all hereby incorporated by reference herein in their entirety.

TECHNICAL FIELD

The present disclosure relates to a station apparatus and a moving robot system.

BACKGROUND

Generally, a moving robot is a device that automatically performs a predetermined operation while traveling by itself in a predetermined range without a user's operation. The moving robot senses obstacles located in the area and performs its operations by moving close to or away from such obstacles.

Such a moving robot may include a cleaning robot that carries out cleaning while traveling in an area, as well as a lawn mower robot that mows the grass on a bottom of the area.

Generally, lawn mowers include a passenger type which a user boards and controls to mow the lawn or cut the grass during movement, and a work-behind type or hand-operating type that is pulled or pushed manually by a user to cut the grass. Such lawn mowers are moved by a direct control of the user to mow the lawn, which causes user's inconvenience in that the device is operated only directly by the user.

Accordingly, a moving robot type lawn mower that an element for mowing the lawn is provided on a moving robot, namely, a lawn mower robot has been studied. However, since the lawn mower robot operates outdoors other than indoors, it is necessary to set an area to be moved in advance. Specifically, since the outdoors is an open space unlike the indoors, an area designation should first be carried out, and an area to be driven by the robot should be limited to a space where grass is growing.

For this purpose, in Korean Patent Laid-Open Publication No. 2015-0125508, wires are laid under the ground where grass is planted, in order to set an area to be moved by a lawn mower robot or a moving robot, and the moving robot is controlled to move in an inner area of the wires. Then, a boundary for the moving robot is set based on a voltage value induced by the wires.

However, this method has a problem that the wires must be laid under the ground every time of setting the boundary. In addition, in order to change the boundary once set, new wires must be laid after the previously laid wires are removed, which causes much time and efforts for the boundary setting.

The US Patent laid-open Publication No. US 2017/0026818 discloses a method in which a distance between Beacon and a mobile lawn mower robot is determined by pairing the Beacon and the mobile lawn mower robot, whether the Beacon is located within a pairing distance is determined by comparing the determined distance with the pairing distance, and the result of the determination is used for a navigator.

Recently, a method of controlling the travel of a moving robot by using a low-cost Ultra-wideband (UWB) communication technology known to have precision of about 30 cm or shorter has been studied. UWB is suitable for real-time location tracking because it is hardly affected by multipath problems by virtue of its properties of precise region estimation and material penetration.

By using such UWB communication technology, a relative location of another device, for example, UWB tag, existing in a UWB positioning range may be calculated. In the case of determining the relative location of the UWB tag using the UWB communication technology, Angle of Arrival (AoA) positioning may be used.

On the other hand, since the moving robot travels using a rechargeable battery, recharging must be performed according to the remaining power level of the battery. Accordingly, researches and commercialization are carried out for charging the moving robot by making the moving robot go to a charging station, which is installed in advance for the moving robot, by itself according to its battery state. However, in outdoor environments, it is not easy for the moving robot to accurately return to the charging station due to a widely open space and various terrain characteristics.

Even if the moving robot reaches the position of the charging station, it is necessary to set an accurate docking path in order to correctly connect its connector to a connector of the charging station. When wires are laid in a boundary of an area where the moving robot travels, the moving robot moves to the charging station along the laid wires, but laying the wires in the boundary causes various other problems.

Korean Patent Registration No. 10-0902115 proposes a method of precisely guiding a moving robot to a charging station using a camera and infrared sensors. However, in the case of the camera and the infrared sensors, a docking position can be precisely guided only when the moving robot approaches the charging station to some extent. Therefore, there are various problems in guiding a docking path to the charging station for the moving robot in a widely open space such as outdoor environments. Also, as in the case where the moving robot is moving toward the charging station from the rear with respect to a docking direction of the charging station, if the moving robot is located in a blind spot of signals (or an angle of view), a docking position is less likely to be induced.

SUMMARY

Technical Problem

One aspect of the present disclosure is to provide a station apparatus, capable of facilitating transmission and reception of UWB signals to and from a moving robot, and a moving robot system.

Another aspect of the present disclosure is to provide a station apparatus, capable of facilitating a return of a moving robot through transmission and reception of UWB signals to and from the moving robot located at a remote distance, and a moving robot system.

Still another aspect of the present disclosure is to provide a station apparatus, capable of facilitating transmission and reception of UWB signals at a current position of a moving robot using an azimuth angle, and a moving robot system.

Technical Solution

To achieve these and other advantages and in accordance with the purpose of this specification, as embodied and broadly described herein, there is provided a station apparatus, including a Ultra-wideband (UWB) module to receive a first UWB signal transmitted by a moving robot, and a control unit to calculate a reception angle of the first UWB signal upon the reception of the first UWB signal, and control the UWB module to transmit a second UWB signal, including a direction value determined based on the reception angle, to the moving robot for return of the moving robot.

The UWB module may include first and second antennas, a motor to rotate the first and second antennas, and a UWB transceiver to transfer the first UWB signal received at at least one of the first and second antennas to the control unit, and transmit the second UWB signal.

The first antenna may be disposed on the same line with the second antenna in a spaced manner, and the first and second antennas may be directional antennas that transmit and receive the first and second UWB signals only at a preset azimuth angle.

The control unit may calculate the reception angle based on a rotation angle of the motor corresponding to a reception time point of the first UWB signal when the first UWB signal is transferred.

The control unit may confirm a current position of the mobile robot on the basis of the reception angle and determine the direction value for return to the charging station based on the current position and a set station position.

The direction value may be a movement path for the moving robot to return to a station position.

The control unit may rotate the motor according to the direction value when the moving robot moves according to the direction value.

The control unit may transmit to the moving robot a third UWB signal for a heading value of the moving robot for charging of the moving robot, when the moving robot moves based on the direction value so as to be located at a return reference point spaced apart from a station position.

To achieve these and other advantages and in accordance with the purpose of this specification, as embodied and broadly described herein, there is provided a moving robot system, including a moving robot performing autonomous travel, and a charging station to charge the moving robot, wherein the charging station include a Ultra-wideband (UWB) module to receive a first UWB signal transmitted by the moving robot, and a control unit to calculate a reception angle of the first UWB signal upon reception of the first UWB signal, and control the UWB module to transmit a second UWB signal, including a direction value determined based on the reception angle, to the moving robot for return of the moving robot, and wherein the moving robot extracts the direction value when the second UWB signal is received after transmitting the first UWB signal, and moves to the charging station based on the direction value.

Advantageous Effects

In a charging station and a moving robot system according to the present disclosure, reception efficiency of UWB signals transmitted by a moving robot can be enhanced by rotating directional antennas.

In addition, in a charging station and a moving robot system according to the present disclosure, signal blind spots can be minimized by rotating directional antennas, and UWB signals which are transmitted at a specific azimuth angle by a moving robot located at a remote distance can be received.

DETAILED DESCRIPTION

Hereinafter, a moving robot according to the present disclosure will be described in detail with reference to the accompanying drawings.

Hereinafter, description will be given in detail of embodiments disclosed herein. Technical terms used in this specification are merely used for explaining specific embodiments, and should not be construded to limit the scope of the technology disclosed herein.

First, the term "moving robot" disclosed herein may be used as the same meaning as "robot" which can autonomously travel, "lawn mower moving robot," "lawn mower robot," "lawn mower," and "moving robot for mowing lawn," and those terms will be used equally.

Figure 1:
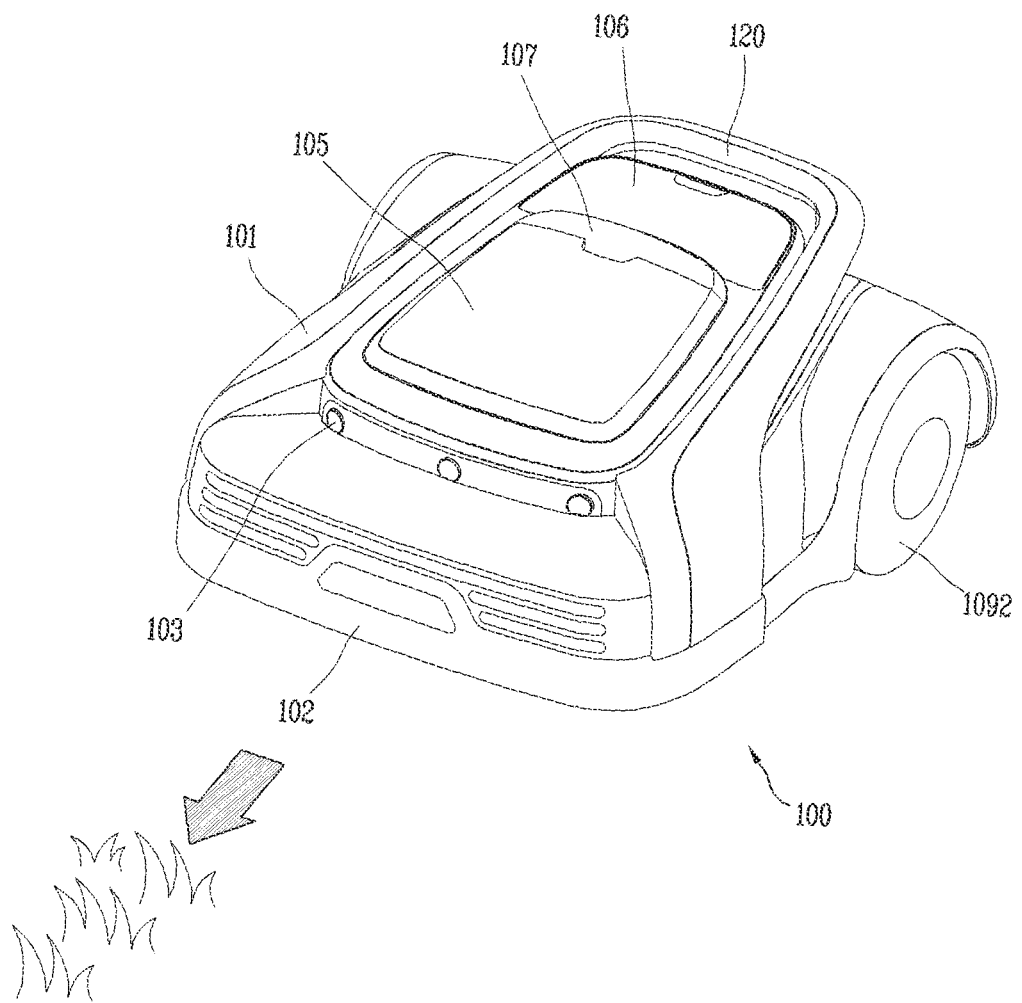
FIG. 1 is a perspective view illustrating an example of a moving robot according to the present disclosure.

FIG. 1 is a perspective view illustrating an example of a moving robot according to the present disclosure.

Referring to FIG. 1, a moving robot according to the present disclosure may include an outer cover 101, an inner body (not shown), and wheels 1092.

The outer cover 101 may define appearance of the moving robot. The appearance of the moving robot may be formed in a shape similar to an automobile, for example. The outer cover 101 may be formed to cover an outside of the inner body (not shown).

The outer cover 101 may be mounted on an upper portion of the inner body so as to cover the upper portion of the inner body. A receiving portion may be formed inside the outer cover 101, and the inner body may be received in the receiving portion.

A bumper 102 may be provided on a front portion of the outer cover 101 in preparation for collision with an obstacle. The bumper 102 may be formed of a rubber material that can mitigate impact.

A plurality of ultrasonic sensor modules 103 may be mounted on a front upper portion of the outer cover 101. The plurality of ultrasonic sensor modules 103 is configured to emit ultrasonic waves toward the front of the robot while the robot travels, and receive reflected waves reflected from the obstacle, so as to detect the front obstacle.

The plurality of ultrasonic sensor modules 103 may be spaced apart from one another in a vehicle width direction. The plurality of ultrasonic sensor modules 103 may be spaced apart from the bumper 102 rearward by a designated distance. In addition, the plurality of ultrasonic sensor modules 103 may be replaced with other signal-based sensors, such as UWB sensors, other than the ultrasonic sensors.

The moving robot may include a control unit. The control unit may stop the operation of the moving robot when an obstacle is detected by receiving a detection signal from the ultrasonic sensor modules 103.

A first top cover 105 and a second top cover 106 may be provided on the top of the outer cover 101. A stop switch 107 may be provided between the first top cover 105 and the second top cover 106. The stop switch 107 may be mounted on the outer cover 101 to be pressed. When the user presses the stop switch 107 one time in an emergency state, the stop switch 107 may be switched on so that the operation of the moving robot is stopped. When the stop switch 107 is pressed once more, the operation of the moving robot may be restarted.

The plurality of wheels 1092 may be connected respectively to driving motors provided in the inner body, and rotatably mounted on both side surfaces of the inner body 160 in a widthwise direction of the inner body 160. Each of the plurality of wheels 1092 may be connected to the driving motors by a driving shaft, so as to be rotatable by receiving power from the driving motors.

The plurality of wheels 1092 may supply power for the travel of the robot, and each of the plurality of wheels 1092 may be controlled by the control unit independently to be rotated by different RPM.

In addition, a handle 120 (which may also be referred to as a 'carrying handle') may be installed on the outer cover 101 so that the user can grip it with a hand while carrying the moving robot.

Figure 2A:
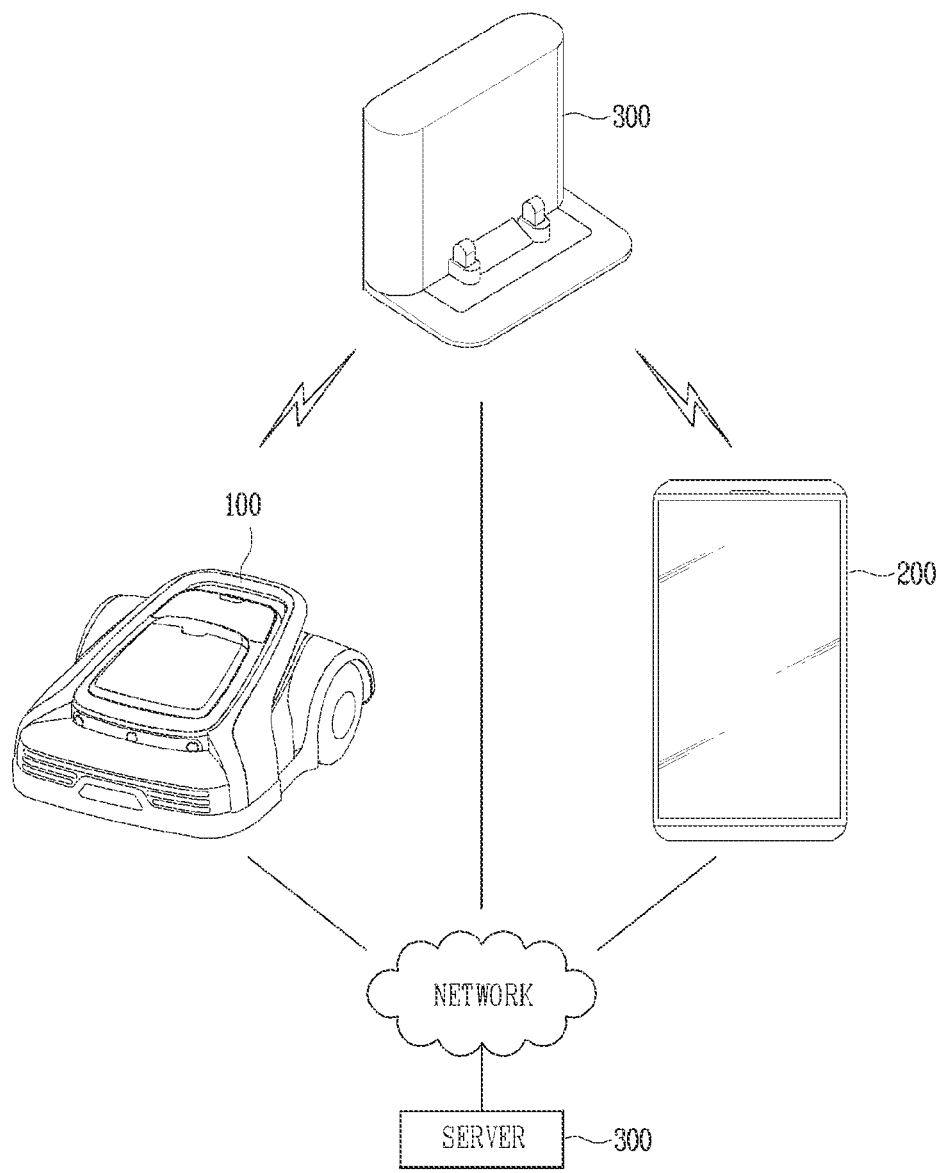
FIG. 2A is a conceptual view illustrating communication of a moving robot system in accordance with the present disclosure.

FIG. 2A is a conceptual view illustrating communication of a moving robot system in accordance with the present disclosure.

FIG. 2A illustrates a state in which the moving robot 100, the charging station 300, the terminal 200, and the server 500 perform communication, in accordance with the present disclosure.

The moving robot 100 according to the present disclosure may exchange data with the charging station 300 or the terminal 200 through network communication.

In addition, the moving robot 100 may perform a weeding-related operation or a corresponding operation according to a control command received from the charging station 300 or the terminal 200 through network communication or other communication. The charging station 300 according to the present disclosure may exchange data with the terminal 200 through network communication.

Here, the network communication may refer to at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

Here, other communications may refer to wireless communication technologies by which communications are performed directly without moving communication networks between the moving robot 100 and the charging station 300, between the moving robot 100 and the terminal 200, and between the charging station 300 and the terminal 200.

The illustrated network communication may vary depending on a communication method of the moving robot 100.

In FIG. 2A, the moving robot 100 may provide information sensed through each sensing unit to the charging station 300 or the terminal 200 through network communication. In addition, the terminal 200 may transmit a control command generated based on the received information to the moving robot 100 through the network communication.

On the other hand, the terminal 200 may be named as a controller, a remote controller, or the like, which is operated by a user to control operations related to the travel of the moving robot 100. To this end, the terminal 200 may be provided with an application installed therein for controlling operations related to the traveling of the moving robot 100, and the corresponding application may be executed through a user operation.

In FIG. 2A, a communication unit of the moving robot 100 and a communication unit of the terminal 200 may also directly communicate with each other or indirectly communicate with each other via another router (not shown), to recognize information related to a traveling operation of the moving robot and locations of the moving robot and the terminal.

Also, the moving robot 100, the charging station 300, the terminal 200 and the server 500 may be connected via a network and exchange data with one another.

For example, the server 500 may exchange data with the moving robot 100, the charging station 300 and/or the terminal 200, to register information related to a boundary set for the moving robot 100, map information based on the set boundary, obstacle information on the map. In addition, the server 500 may provide the registered information to the moving robot 100, the charging station 300 and/or the terminal 200 according to a request.

The server 500 may be wirelessly connected to the moving robot 100 through the terminal 200. Alternatively, the server 500 may be connected to the moving robot 100 without passing through the terminal 200.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

Meanwhile, the server 500 may store firmware information and driving information (course information, and the like) for the moving robot 100, and register product information related to the moving robot 100. For example, the server 300 may be a server managed by a moving robot manufacturer or a server managed by an open application store operator.

Figure 2B:
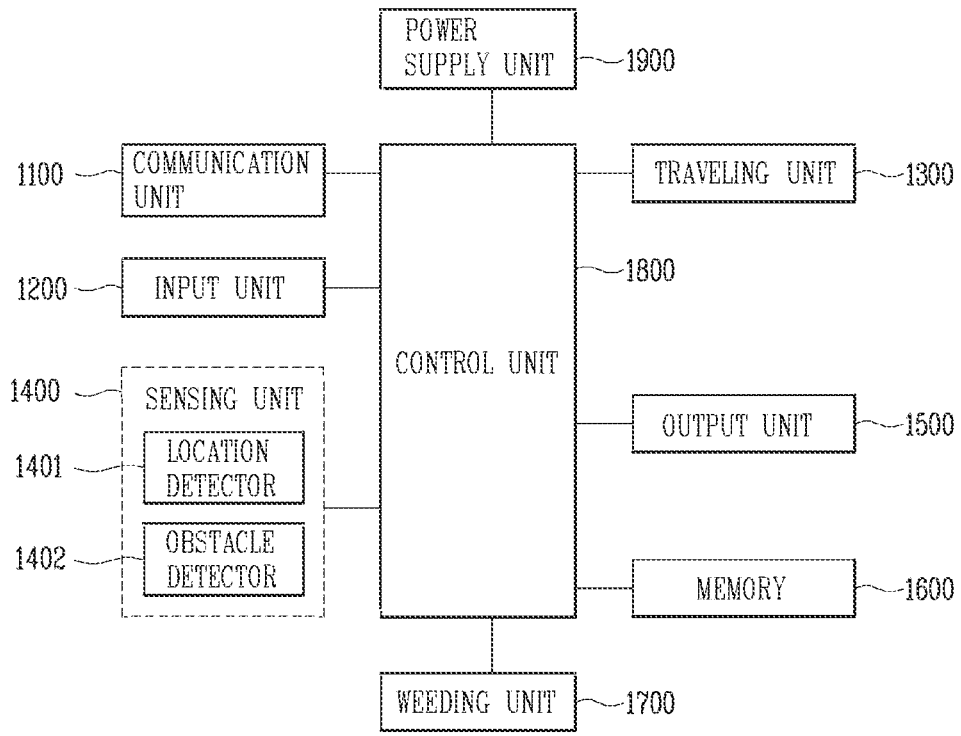
FIG. 2B is a block diagram illustrating an exemplary configuration of a moving robot according to the present disclosure.
Figure 2C:
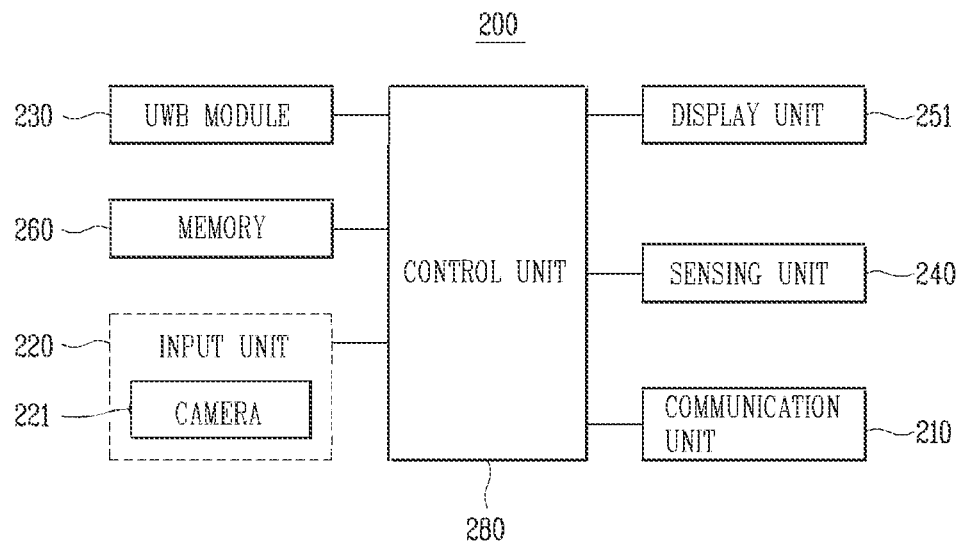
FIG. 2C is a block diagram illustrating an exemplary configuration of a terminal communicating with the moving robot according to the present disclosure.

Hereinafter, FIG. 2B is a block diagram illustrating an exemplary configuration of the moving robot 100 according to the present disclosure, and FIG. 2C is a block diagram illustrating an exemplary configuration of the terminal 200 communicating with the moving robot 100.

First, the configuration of the moving robot 100 will be described in detail with reference to FIG. 2B.

As illustrated in FIG. 2B, the moving robot 100 may include a communication unit 1100, an input unit 1200, a traveling unit 1300, a sensing unit 1400 provided with a location detector 1401 and an obstacle detector 1402, an output unit 1500, a memory 1600, a weeding unit 1700, a control unit 1800, and a power supply unit 1900.

The communication unit 1100 may perform communication with the terminal 200 through a wireless communication scheme. Also, the communication unit 1100 may perform communication with the terminal which is connected to a predetermined network to control an external server or the moving robot.

The communication unit 1100 may transmit information related to a generated map to the terminal 200. The communication unit 1100 may receive a command from the terminal 200 and transmit data regarding an operation state of the moving robot 100 to the terminal 200.

The communication unit 1100 transmits and receives data by being equipped with a communication module such as Wi-Fi, WiBro, and the like, as well as through short-range wireless communications such as Zigbee and Bluetooth. In addition, the communication unit 1100 may include a UWB module for transmitting an UWB signal.

The input unit 1200 may include an input element such as at least one button, a switch, and a touch pad. The output unit 1500 may include an output element such as a display unit and a speaker. When the output unit 1500 is used simultaneously as the input element and the output element, a user command can be input and the operation state of the moving robot can be output through the display unit or the speaker.

The memory 1600 may store therein an input detection signal, reference data for determining an obstacle, and obstacle information regarding a detected obstacle. The memory 1600 may also store therein control data for controlling the operation of the moving robot and data according to a cleaning mode of the moving robot.

The memory 1600 may store therein collected location information, and information related to a travel area and its boundary. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The traveling unit 1300 may include at least one driving motor, and may allow the moving robot to move according to a control command of the control unit 1800. The traveling unit 1300 may include a left wheel driving motor for rotating the left wheel and a right wheel driving motor for rotating the right wheel. In addition, the traveling unit 1300 may further include one or more auxiliary wheels for stable support.

For example, while the moving robot main body travels, the left wheel driving motor and the right wheel driving motor may be rotated in the same direction. A traveling direction of the moving robot main body (or moving robot) 100 may be switched when the left wheel driving motor and the right wheel driving motor are rotated at different speeds or in opposite directions.

The weeding unit 1700 cuts the lawn on a bottom surface while the moving robot is traveling. The weeding unit 1700 is provided with a brush or blade for cutting the lawn, and cuts the lawn on the bottom surface in a rotating manner.

The obstacle detector 1402 may include a plurality of sensors for detecting obstacles existing in front of the moving robot. The obstacle detector 1402 may detect obstacles in front of the main body, namely, in the traveling direction of the moving robot, using at least one of a laser, ultrasonic waves, infrared rays, and a 3D sensor.

In addition, the obstacle detector 1402 may include a camera for capturing the front of the moving robot so as to detect an obstacle. The camera is a digital camera, which may include an image sensor (not shown) and an image processor (not shown). An image sensor is an apparatus for converting an optical image into an electrical signal. The image sensor is configured as a chip on which a plurality of photo diodes is integrated, and the photodiode may be a pixel, for example. Electric charges are accumulated in the respective pixels by an image, which is formed on the chip by light passing through a lens, and the electric charges accumulated in the pixels are converted into an electrical signal (for example, voltage). Charge Coupled Device (CCD), Complementary Metal Oxide Semiconductor (CMOS), and the like are well known as image sensors. In addition, a DSP or the like may be provided as the image processor.

The location detector 1401 includes a plurality of sensor modules for transmitting and receiving location information. The location detector 1401 includes a GPS module that transmits and receives GPS signals or a location sensor module that transmits and receives location information to and from a location information transmitter 50 (see FIG. 3). For example, the location detector 140 is provided with a sensor module that transmits and receives an ultrasonic, UWB, or infrared signal when the location information transmitter transmits a signal through one of ultrasonic wave, Ultra-wideband (UWB), and infrared ray.

When the location sensor module is implemented as a UWB sensor module, even if an obstacle exists between the location information transmitter 50 and the moving robot 100, signals can be transmitted and received through such an obstacle or the like. Therefore, transmission and reception of the UWB signals are smoothly carried out.

Unless otherwise mentioned, it may be premised that the location information transmitter 50 and the moving robot 100, the location information transmitter 50 and the terminal 200, and the moving robot 100 and the terminal 200 are provided with at least one UWB sensor module so as to transmit and receive the UWB signals to and from each other.

Also, even when the moving robot 100 moves while following the terminal 200, the location may be determined using the sensor module.

For example, when the moving robot 100 travels while following the terminal 200, the terminal and the moving robot each include a UWB sensor and perform wireless communication with each other. The terminal may transmit a signal from its UWB sensor. The moving robot may receive the signal of the terminal through its UWB sensor and determine the location of the terminal based on the signal of the terminal so as to follow the terminal.

As described above, since the UWB signal transmitted by the UWB sensor can pass through an obstacle, the signal transmission is not affected even if the user moves while holding the terminal. However, in the case of an obstacle having a designated size or more, the signal transmission may be failed or a signal transmission distance may be reduced even if the signal is transmitted through the obstacle.

In addition, the UWB sensors provided in the terminal and the moving robot, respectively, may estimate or measure a distance between them. When the moving robot follows the terminal, the travel of the moving robot is controlled according to a distance from the terminal, so that the moving robot does not move away from the terminal by a predetermined distance. That is, the moving robot may follow the terminal while maintaining a proper distance so that the distance from the terminal is not too close or too far away.

The location detector 1401 may include one UWB sensor or a plurality of UWB sensors. For example, when the location detector 1401 includes two UWB sensors, for example, the two UWB sensors may be provided on left and right sides of the main body of the moving robot, respectively, to receive signals. Accordingly, the location detector 1401 may detect the location by comparing the received signals.

For example, when the distances measured respectively by the left sensor and the right sensor are different according to the locations of the moving robot and the terminal, relative locations of the moving robot and the terminal and a direction of the moving robot may be determined based on the distances.

Meanwhile, in addition to the obstacle detector 1402 and the location detector 1401, the sensing unit 1400 may include various sensors, such as a cliff detection sensor installed on a rear surface of the main body to detect a cliff, a rain sensor to detect a humid or rainy weather condition, a proximity sensor, a touch sensor, an RGB sensor, a fuel gauge sensor, an acceleration sensor, a geomagnetic sensor, a gravity sensor, a gyroscope sensor, an illuminance sensor, an environmental sensor (a thermometer, a radiation detection sensor, a heat detection sensor, a gas detection sensor, etc.), a plurality of 360-degree sensors, a floor state detection sensor, and the like.

In addition, the sensing unit 1400 may include at least one tilt sensor (not shown) for detecting movement of the main body. The tilt sensor calculates a tilted direction and a tilted angle of the main body when the main body is tilted in a front, rear, left, or right direction. The tilt sensor may be an acceleration sensor, or the like. In the case of the acceleration sensor, any of a gyro type, an inertial type, and a silicon semiconductor type is applicable. In addition, various sensors or devices capable of detecting the movement of the main body may be used.

The control unit 1800 controls data input/output, and controls the traveling unit 1300 so that the moving robot travels according to settings. The control unit 1800 controls the traveling unit 1300 to independently control the operations of the left wheel driving motor and the right wheel driving motor, so that the main body of the moving robot 100 travels straight or rotate.

The control unit 1800 determines a traveling direction corresponding to a signal received through the sensing unit 1400 and controls the traveling unit 1300. In addition, the control unit 1800 controls the traveling unit 1300 to vary a traveling speed, so that the moving robot travels or stops according to the distance from the terminal. Accordingly, the moving robot can move while following locations of the terminal corresponding to the changes in location of the terminal.

In addition, the control unit 1800 may control the moving robot to move, following the terminal 200, according to a set mode.

The control unit 1800 may set a virtual boundary for an area based on location information received from the terminal 200 or location information calculated through the location detector 1401. Also, the control unit 1800 may set any one of areas formed by set boundaries as a travel area. The control unit 1800 sets a boundary in a shape of a closed loop by connecting discontinuous location information with lines or curves, and sets an inner area of the set boundary as the travel area. Also, when a plurality of boundaries is set, the control unit 1800 may set any of areas formed by the plurality of boundaries as a travel area.

When the boundary and the travel area are set, the control unit 1800 controls the traveling unit 1300 so that the moving robot travels within the travel area without moving over the set boundary. The control unit 1800 calculates a current location based on received location information, and controls the traveling unit 1300 so that the calculated current location is located within the travel area set by the boundary.

In addition, the control unit 1800 may determine obstacle information input by the obstacle detector 1402 and travel avoiding obstacles. Also, the control unit 1800 may modify a preset travel area, if necessary, based on the obstacle information.

For example, the control unit 1800 may control the traveling unit 1300 to travel by passing through an obstacle or avoiding the obstacle, by way of changing a moving direction or a travel path in correspondence with obstacle information input from the obstacle detector.

The control unit 1800 may set the moving robot so as not to approach a cliff by a predetermined distance or closer when the cliff is detected. In addition, the control unit 1800 may change a traveling direction according to a user selection, which is input through the terminal 200, by way of transmitting traveling information regarding a detected obstacle to the terminal 200 and displaying such information on the terminal.

The power supply unit 1900 includes a rechargeable battery (or battery module) (not shown). The battery may be detachably mounted to the moving robot 100. When it is detected through the sensing unit 1400 that the battery gauge is insufficient, the control unit 1800 may control the traveling unit 1300 to move the moving robot to the location of a charging station for recharging the battery. When presence of the charging station is detected by the sensing unit 1400, recharging of the battery is performed.

Hereinafter, the main configuration of the terminal 200 that performs communication with the moving robot 100 according to the present disclosure will be described, with reference to FIG. 2C.

Referring to FIG. 2C, the terminal 200 may include a mobile terminal that can be carried by a user and may include a communication unit 210, an input unit 220, a UWB module 230, a sensing unit 240, a display unit 251, a memory 260, and a control unit 280.

The communication unit 210 may perform communication with an external server or the moving robot 100 through wireless communication. The communication unit 210 transmits and receives data by being equipped with a communication module such as Wi-Fi, WiBro, and the like, as well as through short-range wireless communications such as Zigbee and Bluetooth. In addition, the communication unit 210 may include a UWB module for transmitting a UWB signal.

The input unit 220 may include an input element such as at least one button, a switch, and a touch pad.

Also, the input unit 220 is configured to permit various types of inputs to the wearable device 100. Examples of such inputs include image information (or signal), audio information (or signal), data or various information input by a user, and may be provided with one or a plurality of cameras 221.

Such cameras 221 may process image frames of still pictures or videos obtained by image sensors in an image capture mode. The processed image frames may be displayed on the display unit 251 or stored in memory 170. Meanwhile, the cameras 221 provided in the terminal 200 may be arranged in a matrix configuration to permit a plurality of images having various angles or focal points to be input to the terminal 200. Also, the cameras 221 may be located in a stereoscopic arrangement to acquire left and right images for implementing a stereoscopic image.

The camera 221 typically includes at least one a camera sensor (CCD, CMOS, etc.), a photo sensor (or image sensors), and a laser sensor.

The camera 221 and the laser sensor may be combined with each other to sense a touch of an object to be sensed with respect to a three-dimensional (3D) stereoscopic image. The photo sensor may be stacked on a display element, and configured to scan a motion of an object to be sensed, closely approaching a touch screen. More specifically, the photo sensor is provided with photo diodes and transistors (TRs) mounted in rows/columns. Accordingly, an object placed on the photo sensor is scanned using electric signals which change according to an amount of light applied to the photo diodes. That is, the photo sensor may perform coordinates calculation of an object to be sensed according to a change in an amount of light, and acquire position information regarding the object to be sensed based on the coordinates.

The display unit 251 may include a touch sensor to receive a control command through a touch input. In addition, the display unit 251 may be configured to output a control screen for controlling the moving robot 100, and a map screen on which a set boundary and the location of the moving robot 100 are displayed.

The memory 260 may store therein data related to the travel of the moving robot 100. In addition, the memory 260 may store therein location information regarding the moving robot 100 and the terminal 200, and information regarding a travel area of the moving robot and a boundary of the travel area. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The sensing unit 240 includes a location detector (not shown) for transmitting and receiving location information, and at least some of a gyro sensor and an acceleration sensor for sensing a change in spatial motion of the terminal 200, a geomagnetic sensor, and an Inertia Measurement Unit (IMU) sensor. At this time, the gyro sensor and the acceleration sensor may be implemented as any one of 3-axis, 6-axis, or 9-axis gyro sensor and acceleration sensor.

The location detector includes a plurality of sensor modules for transmitting and receiving location information. For example, the location detector may include a GPS module, an Ultra-Wideband (UWB) module, a geomagnetic sensor, an acceleration sensor, a gyro sensor, and the like, to recognize coordinates of a point which is indicated by a posture change such as a tilt or the like, as well as a current location of the terminal 200.

The UWB module 230 which is included in the location detector or separately provided may exchange UWB signals with the moving robot 100 and/or the location information transmitter 50. Accordingly, not only the location of the terminal 200 but also the location of the moving robot 100 with respect to the terminal 200, the location of the location information transmitter 50 with respect to the terminal 200, the location of the location information transmitter 50 with respect to the moving robot 100, and the like can be recognized.

The acceleration sensor is a sensor that measures how much force an object is receiving based on gravitational acceleration of the earth. A three-axis acceleration sensor refers to a sensor capable of measuring magnitude of acceleration in x, y, and z-axial directions. Such an acceleration sensor may be used as one three-axis acceleration sensor, a six-axis acceleration sensor with two three-axis acceleration sensors applied, or a nine-axis acceleration sensor with three three-axis acceleration sensors applied.

By using a sensing value of the three-axis acceleration sensor, roll (rotation with respect to the x axis) and pitch (rotation with respect to the y axis) may be calculated. A unit used is [g]. On the other hand, rotation with respect to the z axis coinciding with the direction of gravitational acceleration, that is, a yaw (rotation with respect to the z axis) value may be calculated only by additionally applying a three-axis gyro sensor or a magnetometer. Also, in a motion state in which an object is not stopped, a tilt value cannot be detected by only the three-axis acceleration sensor.

The three-axis gyro sensor is a sensor for controlling posture of an object, namely, a sensor capable of measuring angular velocity in the x, y, and z-axial directions. Here, the angular velocity refers to an angle of rotation per hour. A unit used is [degree/sec].

The IMU sensor is a combined sensor of a three-axis acceleration sensor and a three-axis gyro sensor. Alternatively, the IMU sensor is a nine-axis sensor with a three-axis acceleration sensor, a three-axis gyro sensor, and a three-axis geomagnetic sensor. By using such an IMU sensor, the roll, the pitch and the yaw can all be calculated.

The UWB module 230 may transmit or receive a UWB signal through a UWB module provided in the moving robot 100. The terminal 200 may play a role of 'remote control device' in that it can control the travel or weeding operation of the moving robot 100 through communication with the moving robot 100.

In addition to the UWB module 210, the terminal 200 may further include a distance measuring sensor.

The distance measuring sensor may emit at least one of a laser light signal, an IR signal, an ultrasonic signal, a carrier frequency, and an impulse signal, and may calculate a distance from the terminal 200 to the corresponding signal based on a reflected signal.

To this end, the distance measuring sensor may include, for example, a time of flight (ToF) sensor. For example, the ToF sensor may include a transmitter that emits an optical signal transformed to a specific frequency, and a receiver that receives and measures a reflected signal. When the ToF sensor is installed on the terminal 200, the transmitter and the receiver may be spaced apart from each other to avoid signal affection therebetween.

Hereinafter, the laser light signal, the IR signal, the ultrasonic signal, the carrier frequency, the impulse signal, and the UWB signal described above may collectively be referred to as 'signal'. In this specification, 'UWB signal' which is rarely affected by an obstacle will be exemplarily described. Therefore, it can be said that the distance measuring sensor plays a role of calculating a distance from the terminal 200 to a point where a signal is emitted. In addition, the distance measuring sensor may include a transmitter that emits signals and one receiver or a plurality of receivers for receiving reflected signals.

Hereinafter, an exemplary configuration of the charging station 300 for charging a power supply unit (battery) included in the moving robot according to the present disclosure will be described with reference to FIG. 2D.

Figure 2D:
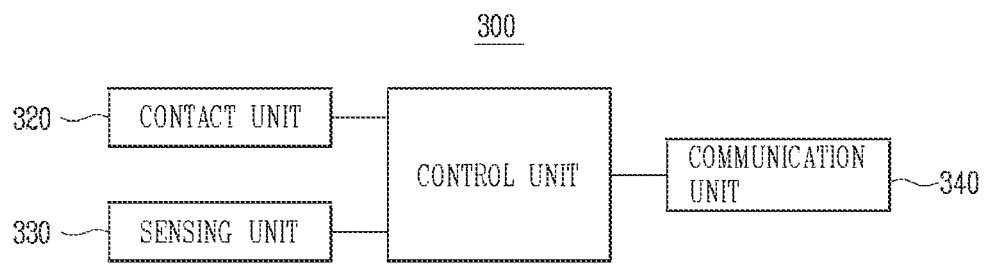
FIG. 2D is a block diagram illustrating an exemplary configuration of a charging station communicating with the moving robot according to the present disclosure.

Referring to FIG. 2D, the charging station 300 may include a charging contact unit 320, a sensing unit 330, a communication unit 340, and a control unit (or processor).

The charging station 300 may include a charge contact unit 320 configured to transmit and receive electric signals with the moving robot 100 and to charge the battery included in the moving robot 100. When a connector provided in the moving robot 100 and the charging contact unit 320 are in contact with each other, the battery provided in the moving robot 100 may be charged.

The sensing unit 330 may sense a position, a traveling path, and a posture (a direction which the moving robot faces) of the moving robot 100 which is approaching the charging station 300.

Thereafter, the control unit (processor) may transmit information sensed by the sensing unit 330 to the moving robot 100 through the communication unit 340, so that the moving robot properly docks to the charging station (or the connector of the moving robot and the charging contact unit of the charging station are properly in contact with each other).

In addition, the sensing unit 330 may be configured to sense surrounding information of the charging station 300. For example, the sensing unit 330 may sense an event occurring in a space where the charging station 300 is installed.

The sensing unit 330 may also sense information related to the moving robot 100 or information related to the terminal 200.

For example, the sensing unit 330 may sense a distance between the moving robot 100 and the charging station 300, the position of the moving robot 100, a direction (or angle) that the moving robot 100 is located, a traveling path (or traveling trajectory) of the moving robot 100, and whether or not the moving robot 100 is approaching the charging station 300.

Also, the sensing unit 330 may sense location information (position information) regarding the terminal 200 with respect to the charging station 300.

For this, the sensing unit 330 may include a UWB module configured to transmit and receive UWB signals to and from a UWB module provided in the terminal 300 or the moving robot 100.

That is, the sensing unit 330 may include a distance measuring sensor.

The distance measuring sensor may emit at least one of a laser light signal, an IR signal, an ultrasonic signal, a carrier frequency, and an impulse signal, and may calculate a distance to the corresponding signal based on a reflected signal.

To this end, the distance measuring sensor may include, for example, a time of flight (ToF) sensor. For example, the ToF sensor may include a transmitter that emits an optical signal transformed to a specific frequency, and a receiver that receives and measures a reflected signal. The transmitter and the receiver may be spaced apart from each other to avoid signal affection therebetween.

The communication unit 340 may perform communication with an external server 500, the terminal 200, or the moving robot 100 through wireless communication. The communication unit 340 transmits and receives data by being equipped with a communication module such as Wi-Fi, WiBro, and the like, as well as through short-range wireless communications such as Zigbee and Bluetooth. In addition, the communication unit 340 may include a UWB module for transmitting a UWB signal.

Also, the communication unit 340 may perform communication with the server 400, the terminal 200, or the moving robot 100 through the network communication described above. To this end, the communication unit 340 may be wirelessly connected to the mobile communication network and may communicate with the server 500, the terminal 200, or the moving robot 100 through the mobile communication network.

However, the present disclosure is not limited to this, and the communication unit 340 may be configured to directly communicate with the moving robot 100 or the terminal 200.

Figure 3:
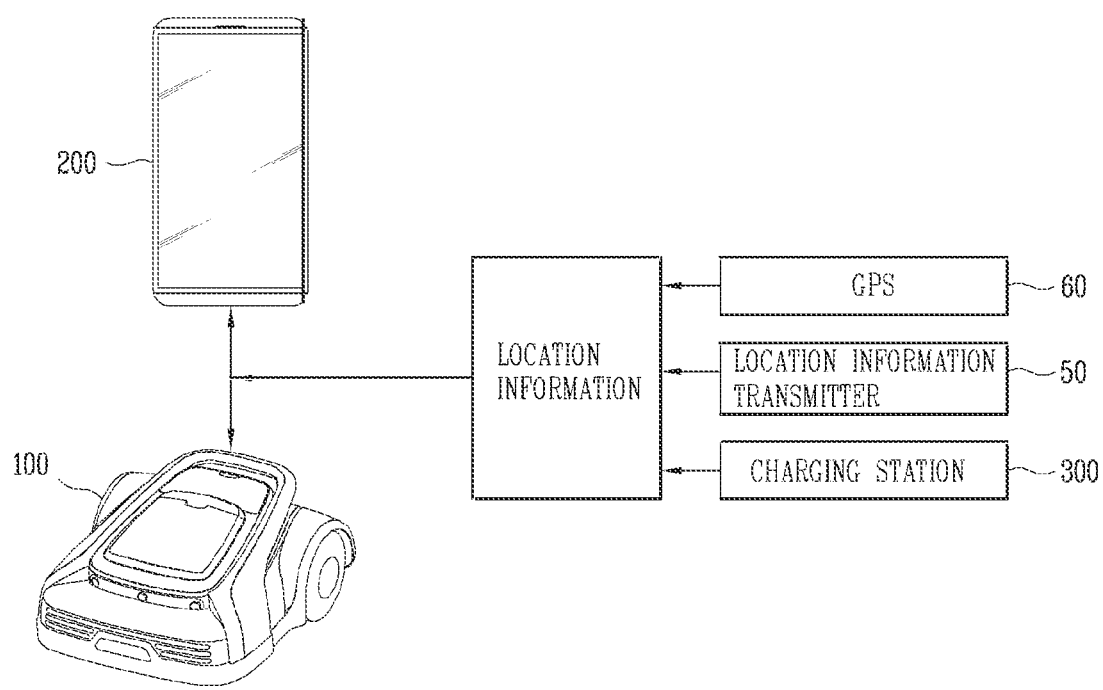
FIG. 3 is a conceptual view illustrating a signal flow generated during communication among a moving robot, a terminal, a charging station, a location information transmitter, and GPS, in accordance with an embodiment of the present disclosure.

Hereinafter, FIG. 3 is a conceptual view illustrating a signal flow of devices for setting a boundary with respect to a moving robot, for example, a signal flow of the moving robot 100, the terminal 200, a GPS 60, the location information transmitter 50, and the charging station 300.

The signal transmitted from the charging station 300 may be an Ultra-wideband (UWB) signal. To this end, the charging station 300 may comprise at least one UWB module (UWB sensor). In this case, the moving robot 100 may receive the UWB signal transmitted from the charging station 300, and determine the current position based on the UWB signal.

In addition, the charging station 300 may include a GPS module to transmit GPS signals. In this case, the GPS signals transmitted from the charging station 300 may be received by the GPS satellite. The GPS satellite may transmit a reception result of the GPS signal received from the charging station 300 to the moving robot 100.

When the location information transmitter 50 transmits a signal by its UWB sensor, the terminal 200 may receive a signal related to location information from the location information transmitter 50 through a UWB module provided in the terminal 200 itself. At this time, a signaling method of the location information transmitter 50 and a signaling method between the moving robot 100 and the terminal 200 may be the same or different from each other.

For example, the terminal 200 may transmit ultrasonic waves and the moving robot 100 may receive the ultrasonic waves of the terminal 200 to follow the terminal 200. As another example, a marker may be attached on the terminal 200. The moving robot 100 may recognize the marker attached on the terminal 200 by capturing a moving direction of the terminal, so as to follow the terminal 200.

In FIG. 3, location information may be received from the location information transmitter 50 or the GPS 60. A GPS signal, an ultrasonic signal, an infrared signal, an electromagnetic signal, or a UWB signal may be used as a signal corresponding to the location information.

The moving robot needs to collect location information for setting a travel area and a boundary. The moving robot 100 may collect location information by setting any one point of an area as a reference location. At this time, a location of any one of an initial start point, the charging station, and the location information transmitter 50 may be set as the reference location. The moving robot 100 may generate coordinates and a map for the area on the basis of the set reference location and store the generated coordinates and map. When the map is generated and stored, the moving robot 100 may move based on the map.

In addition, the moving robot 100 may set a new reference location at every operation, and determine a location within the area based on the newly-set reference location.

Also, the moving robot 100 may receive location information collected from the terminal 200 which is moving along a predetermined path. The terminal 200 may move arbitrarily and its moving path may change according to a subject which moves the terminal. However, in order to set a travel area of the moving robot, the terminal 200 may preferably move along an outer side of the travel area.

The terminal 200 calculates coordinates of a location within an area based on a reference location. In addition, the moving robot 100 may collect location information while moving with following the terminal 200.

When the terminal 200 or the moving robot 100 travels along a predetermined path alone, the terminal 200 or the moving robot 100 may calculate a current location based on a signal transmitted from the GPS 60 or the location information transmitter 50.

The moving robot 100 and the terminal 200 may move by setting the same reference location with respect to a predetermined area. When the reference location is changed at every operation, the reference location set with respect to the terminal 200 and location information collected from the reference location may be transmitted to the moving robot 100. The moving robot 100 may set a boundary based on the received location information.

Meanwhile, the moving robot 100 and the terminal 200 may determine their relative locations using Ultra-wide Band (UWB) technology. To this end, one of UWB modules may be a UWB anchor and the other one may be a UWB tag.

For example, the UWB module 230 of the terminal 200 may operate as 'UWB tag' that emits an UWB signal, and the UWB module of the moving robot 100 may operates as 'UWB anchor' that receives a UWB signal.

However, it should be noted that the present disclosure is not limited to this. For example, the UWB module 230 of the terminal 200 may operate as an UWB anchor, and the UWB module of the moving robot 100 may operate as a UWB tag. In addition, the UWB module may include one UWB anchor and a plurality of UWB tags.

Hereinafter, description will be given of a method in which the moving robot 100 and the terminal 200 determine (recognize) their relative locations through a UWB communication technology. First, a distance between the moving robot 100 and the terminal 200 is calculated using a distance measurement technology such as a ToF (Time of Flight) scheme.

Specifically, a first impulse signal, which is a UWB signal radiated (emitted) from the terminal 200, is transmitted to the moving robot 100. To this end, the UWB module of the terminal 200 may operate as 'UWB tag' for transmission and the UWB module of the moving robot 100 may operate as 'UWB anchor' for reception.

Here, the UWB signal (or the impulse signal) can be smoothly transmitted and received even if an obstacle exists in a specific space, and the specific space may have a radius of several tens of meters (m).

The first impulse signal may be received through the UWB anchor of the moving robot 100. The moving robot 100 which has received the first impulse signal transmits a response signal to the terminal 200. Then, the terminal 200 may transmit a second impulse signal, which is an UWB signal with respect to the response signal, to the moving robot 100. Here, the second impulse signal may include delay time information which is calculated based on a time at which the response signal has been received and a time at which the second impulse signal has been transmitted responsive to the response signal.

The control unit of the moving robot 100 may calculate a distance between the moving robot 100 and the terminal 200, based on a time at which the response signal has been transmitted, a time at which the second impulse signal has been arrived at the UWB anchor of the moving robot 100, and the delay time information included in the second impulse signal.

$$\text{Distance} = c \times \frac{t_2 - t_1 - treply}{2}$$

Here, t2 denotes an arrival time of the second impulse signal, t1 denotes a transmission time of the response signal, treply denotes a delay time, and c denotes a constant value indicating a speed of light.

As such, the distance between the moving robot 100 and the terminal 200 can be determined by measuring a time difference between signals transmitted and received between the UWB tag and the UWB anchor included in the moving robot 100 and the terminal 200, respectively.

A distance between the moving robot 100 and the location information transmitter 50 and a distance between the terminal 200 and the location information transmitter 50 can also be determined in the same or similar manner.

Hereinafter, an operation of setting a boundary with respect to the moving robot 100 using the location information transmitter 50 and the terminal 200 without laying wires under the ground will be described, with reference to FIGS. 4A to 4C.

In this manner, a boundary which is a reference of a travel area may be set using the location information transmitter 50, the terminal 200, and the moving robot 100, or using only the location information transmitter 50 and the moving robot 100, without embedding wires. A travel area which is distinguished by the boundary may be referred as to 'wireless area.'

The 'wireless area' may be one or plural. In addition, one wireless area may include a plurality of spot areas additionally set in the corresponding area, so that a mowing function performed by the moving robot 100 can be performed more efficiently.

A boundary must be set so that the moving robot 100 can perform mowing while moving in a travel area set outdoors. Then, a travel area, namely, a wireless area in which the moving robot 100 is to travel is designated inside the set boundary.

Figure 4A:
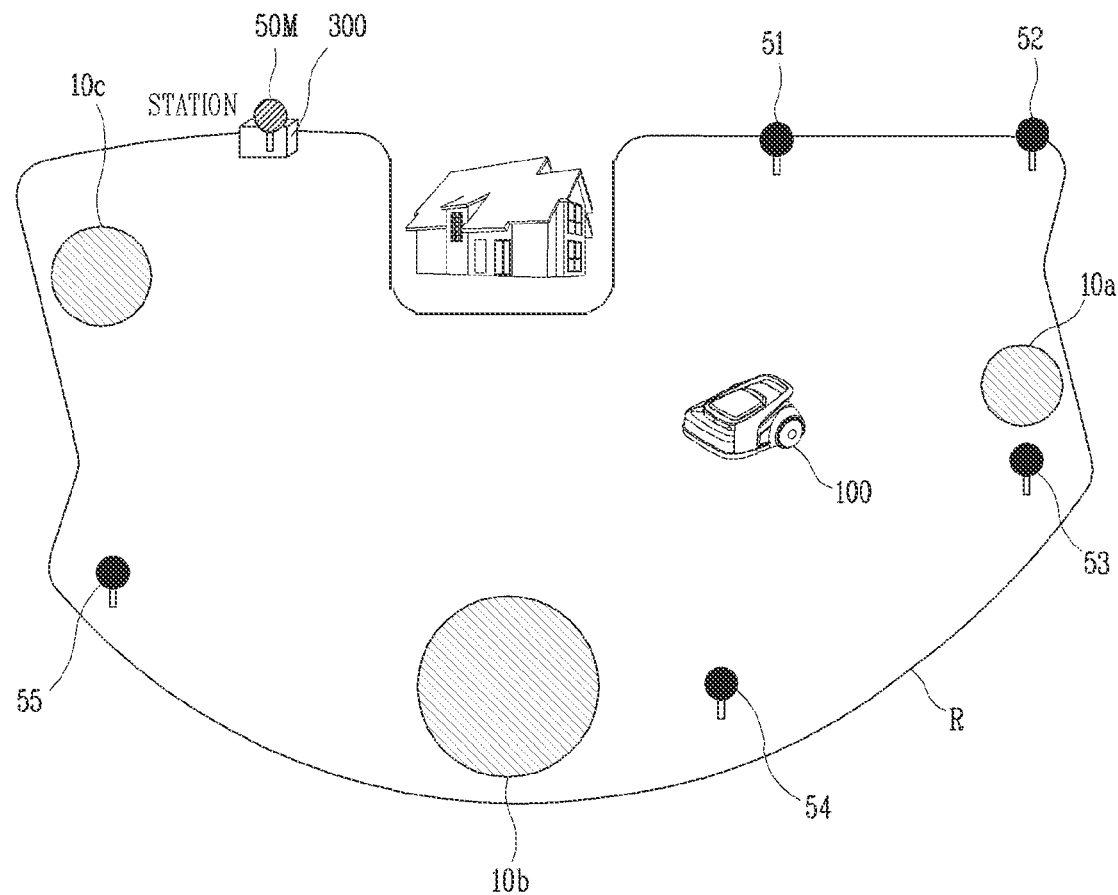
FIGS. 4A, 4B and 4C are conceptual views related to setting a virtual boundary for the moving robot without laying wires under the ground, in accordance with an embodiment of the present disclosure.

Referring to FIG. 4A, there may be various obstacles 10a, 10b, and 10c at the outdoors in addition to a house illustrated in the drawing. Here, the obstacles 10a, 10b, and 10c may include, for example, fixed obstacles such as a building, a rock, a tree, a swimming pool, a pond, a statue, a garden, and the like, which exist at the outdoors, and obstacles that move. Also, size and shape of the obstacles 10a, 10b, and 10c may be very various.

If the obstacles are present close to the set boundary, the boundary must be set, from the beginning, to avoid these various obstacles 10a, 10b, 10c.

However, as illustrated in FIG. 4A, when the obstacles 10a, 10b, and 10c exist within a travel area set based on a boundary R, additional boundaries for the respective obstacles 10a, 10b, and 10c should be set or the previouslyset boundary should be changed through the same or similar process to the method of setting the travel area inside the boundary R.

Also, in the present disclosure, a plurality of location information transmitters 50M, 51, 52, 53, 54, and 55 may be installed in advance in a predetermined area, in order to set a boundary without laying wires.

The plurality of location information transmitters 50M, 51, 52, 53, 54, and 55 may transmit signals. Specifically, the plurality of location information transmitters 50M, 51, 52, 53, 54, and 55 may transmit signals to one another or may transmit signals to the moving robot 100 and/or the terminal 200.

Here, the signals may include, for example, UWB signals, ultrasonic signals, infrared signals, Bluetooth signals, Zigbee signals, or the like.

At least three of the plurality of location information transmitters 50M, 51, 52, 53, 54, and 55 may be installed in a spaced manner. Also, the plurality of location information transmitters 50M, 51, 52, 53, 54, and 55 may be installed at high points higher than a reference height, in order to minimize signal interference when the UWB sensor is not included.

The plurality of location information transmitters 50M, 51, 52, 53, 54, and 55 is preferably installed at locations adjacent to a boundary to be set. The plurality of location information transmitters 50M, 51, 52, 53, 54, and 55 may be installed outside or inside a boundary to be set.

For example, FIG. 4A illustrates a plurality of location information transmitters 50M, 51, 52, 53, 54, and 55 installed inside the boundary R, but the present disclosure is not limited thereto. For example, the plurality of location information transmitters 50M, 51, 52, 53, 54 and 55 may be installed outside the boundary R, or some may be installed inside the boundary R and the others outside the boundary R.

When the location information transmitter 50M, 51, 52, 53, 54, 55 includes a UWB sensor, the UWB sensor may transmit and receive UWB signals to and from the moving robot 100 and/or the terminal 200 located in a predetermined area, so as to calculate location information regarding the moving robot 100 and/or the terminal 200.

For example, the moving robot 100 may calculate the location of the moving robot 100 by comparing amounts/intensities of signals of the plurality of location information transmitters 50M, 51, 52, 53, 54, and 55 and determining a spaced distance and direction from each location information transmitter. A method of calculating location information regarding the terminal 200 may be similarly performed.

At least one of the plurality of location information transmitters 50M, 51, 52, 53, 54, and 55 may be a reference location information transmitter 50M for setting a boundary. The reference location information transmitter 50M may be installed at a place where a charging station 70 is located, for example, as illustrated in FIG. 4A.

coordinates values of the plurality of location information transmitters 50M, 51, 52, 53, 54, and 55 may be set based on the reference location information transmitter 50M. More specifically, the location information transmitter 50M may transmit and receive signals to and from the remaining location information transmitters 51, 52, 53, 54, and 55, to calculate x and y coordinate values corresponding to the locations of the remaining location information transmitters, with respect to the reference location information transmitter as a zero point. Accordingly, the location information regarding the plurality of location information transmitters 50M, 51, 52, 53, 54, and 55 can be set.

When the moving robot 100 sets the charging station 70 where the reference location information transmitter 50M is located as an operation start point, it may be easier to determine (recognize) the location of the moving robot 100 at every operation. Also, when a battery gauge is insufficient during the travel of the moving robot 100, the moving robot 100 may move to the reference location information transmitter 50M where the charging station 70 is located and charge the battery.

When the reference location information transmitter 50M is installed at a place where the charging station 70 is located, it is not necessary to set the location of the charging station 70 separately.

On the other hand, when the moving robot 100 becomes significantly far away from the reference location information transmitter 50M as it keeps traveling, the reference location information transmitter may be changed to another location information transmitter which is located close to a current location of the moving robot, based on amounts/intensities of signals transmitted from the plurality of location information transmitters 50M, 51, 52, 53, 54, and 55.

On the other hand, unlike FIG. 4A, when the charging station 70 is located outside the boundary R, that is, the boundary has been set at an inner side than the charging station 70, the moving robot 100 may return to the charging station over the boundary for recharging the battery.

However, when the charging station 70 is located outside the boundary, a moving area (not shown) may be additionally set between the charging station 70 and the travel area set within the boundary, so as to guide the moving robot 100 to return to the charging station 70 located outside the boundary.

Hereinafter, FIG. 4B exemplarily illustrates a method of setting a boundary for the moving robot 100 and a travel area with respect to the boundary, by using the plurality of location information transmitters 50M, 51, 52, 53, 54, and 55 and the terminal 200.

First, the terminal 200 moves from the location information transmitter 55 along a first path 401 at an outer side of an area, in which lawn is planted. At this time, the terminal 200 may be moved by a person, but may also be moved by another transportation device such as a drone.

The terminal 200 may determine a current location through the location information transmitter 55 or a GPS. As the mobile terminal 200 moves, a distance and direction to each location information transmitter may be calculated based on signals transmitted from the other location information transmitters 51 to 54. Accordingly, coordinates of the plurality of points corresponding to the change of the location of the terminal 200 may be recognized and stored as location information.

In this regard, each of the plurality of location information transmitters 50M, 51, 52, 53, 54, and 55 may transmit a UWB including unique information for identifying a signal. Accordingly, the terminal 200 can individually analyze and process a first signal 411 transmitted from the first location information transmitter 51, a second signal 412 transmitted from the second location information transmitter 52, a third signal 413 transmitted from the third location information transmitter 53, and a fourth signal 414 transmitted from the fourth location information transmitter 54.

In addition to this, the first to third location information transmitters 51 to 53 may transmit and receive signals 421 to 423 to the fourth location information transmitter 54, which is located close to the current location of the terminal 200, receive a response signal to the transmitted signals, and transmit a signal 424 corresponding to the response signal to the terminal. The terminal can check whether or not there is an error between the current location of the corresponding location information transmitter 54 and the predefined location (initially-installed point) based on the signal 424.

According to this, the location error of the location information transmitter can be checked together when the moving robot 100 moves for setting the travel area or the wireless area.

When the movement corresponding to the first path 401 is completed, for example, when the first path 401 forms a shape of a closed curve or reaches a designated end point, the terminal 200 transmits location information, which has been stored while moving along the first path 401, to the moving robot 100.

Then, the moving robot 100 may set a line, which sequentially connects the location information stored while the terminal 200 moves along the first path 401, or an outer line of the line, as a boundary R. In addition, the moving robot 100 may set an inner area of the first path 401 with respect to the set boundary R as a travel area or a wireless area.

The moving robot 100 may perform test traveling in the set travel area or wireless area. At this time, the boundary and/or the travel area may be partially modified by the moving robot 100. For example, the boundary and/or the travel area for the moving robot 100 may be partially modified in consideration of situation information, collected when a new obstacle is detected, when an existing obstacle is removed, when an uneven surface or a pothole is detected, or when a non-travelable spot due to the traveling function of the moving robot 100 is detected.

Figure 4B:
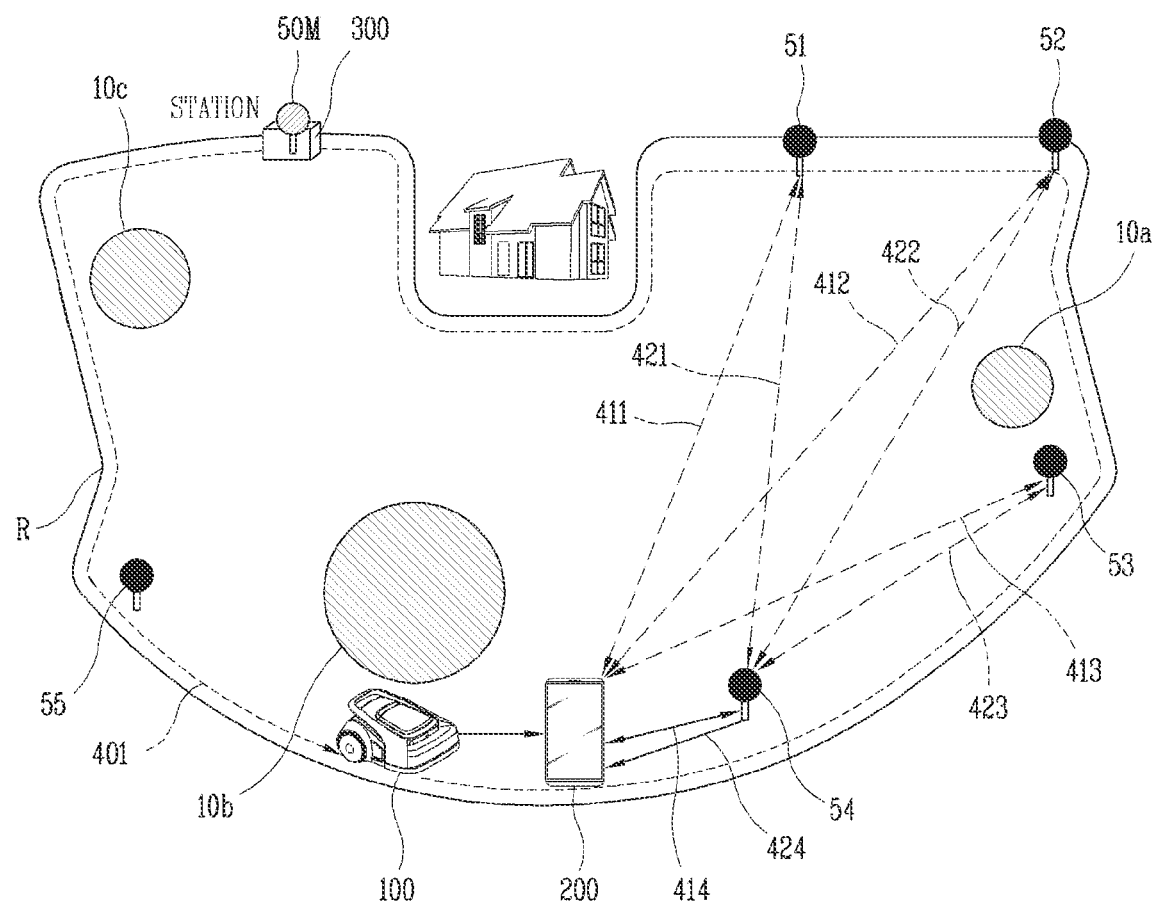

Or, as illustrated in FIG. 4B, the moving robot 100 follows the location of the terminal 200 at a predetermined distance while the terminal 200 moves along the first path 401, and accordingly the boundary and/or the travel area for the moving robot 100 can be set without additional test traveling.

At this time, there may be a difference between the first path 401 along which the terminal 200 has moved and the moving path of the moving robot 100 following the terminal 200. That is, the moving robot 100 can move, following the terminal 200, in a manner of ignoring or removing a location which the moving robot 100 cannot follow on the track of the first path 401, along which the terminal 200 has moved. In this case, the moving robot 100 may store the corresponding location change and may keep following the current location of the terminal 200 based on points corresponding to the location change.

When the distance between the terminal 200 and the moving robot 100 exceeds a predetermined distance as the traveling speed of the moving robot 100 is slowed due to obstacle avoidance or the like, a designated warning sound ('first warning sound') may be output from the moving robot 100 to notify the excess so that a user or the like moving the terminal 200 can stop the movement of the terminal 200.

Thereafter, when the moving robot 100 restarts to travel by avoiding obstacles and the like in a designated manner and accordingly the distance to the terminal 200 in the stopped state is reduced to be in a designated range again, a corresponding warning sound ('second warning sound') may be output from the moving robot 100 to notify it so that the user or the like moving the terminal 200 can perform the movement.

Meanwhile, FIG. 4B exemplarily illustrates that the location information regarding the moving robot 100 and/or the terminal 200 is calculated by the plurality of location information transmitters 50M, 51, 52, 53, 54, and 55 upon movement for setting the travel area or wireless area, but such location information may, of course, be calculated through GPS.

Figure 4C:
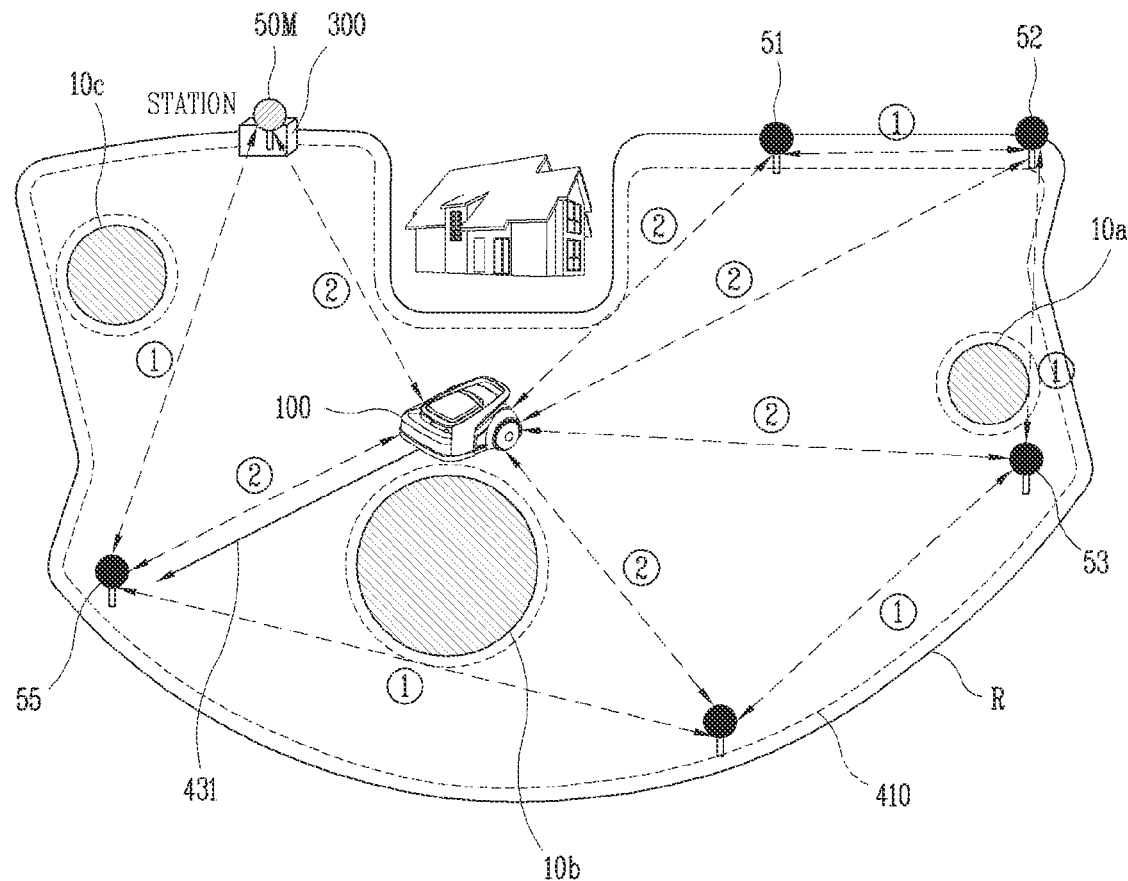

FIG. 4C exemplarily illustrates that additional boundaries for a plurality of obstacles 10a, 10b, and 10c existing in a travel area (or wireless area) 410 in a state where a boundary R and the travel area inside the boundary R have been set.

In FIG. 4C, if there are obstacles 10a, 10b, and 10c having a predetermined size or greater inside the set travel area 410, additional boundaries for the detected obstacles 10a, 10b, and 10c may be set.

The moving robot 100 (or the terminal 200 and the moving robot 100 or the terminal 200) may set additional boundaries and a travel area with respect to the additional boundaries by moving along outer peripheries of the obstacles 10a, 10b, and 10c in the same or similar manner as described above with reference to FIG. 4B.

In FIG. 4C, dashed lines formed at the outside of the obstacles 10a, 10b, 10c may indicate the additional boundaries. Unlike the boundary set in FIG. 4B, an inner side is set as a non-travelable area and an outer side as a travelable area, with respect to the set additional boundary.

Thus, the change of the travel area due to the setting of the additional boundary can be reflected in the modification of the existing boundary and travel area. A map corresponding to the existing boundary and travel area can also be modified accordingly.

The moving robot 100 may perform operations such as weeding and the like while moving in the travelable area within the travel area. While the moving robot 100 moves in the travelable area within the travel area, the plurality of location information transmitters 50M, 51, 52, 53, 54 and 55 transmit signals, for example, UWB signals ① to one another, thereby determining their locations. Also, the plurality of location information transmitters 50M, 51, 52, 53, 54 and 55 transmit signals, for example, UWB signals ① to the moving robot 100, so that the moving robot 100 can recognize its current location within the travel area.

Meanwhile, the moving robot 100 according to the present disclosure may determine (recognize) the relative location of a location information transmitter or a charging station based on a UWB signal transmitted from the location information transmitter or the charging station.

Here, the location information transmitter or the charging station that transmits the UWB signal may be referred to as "UWB anchor". The moving robot 100 that recognizes the position by receiving the UWB signal transmitted from the location information transmitter or the charging station may be referred to as "UWB tag". An Angle of Arrival (AoA) positioning technology may be used as one of positioning technologies by which a UWB anchor recognizes the position of a UWB tag.

The moving robot 100 uses the AoA (Angle of Arrival) positioning technique to determine the relative location of the location information transmitter. Hereinafter, an AoA (Angle of Arrival) positioning technique will be described with reference to FIG. 5A.

Figure 5:
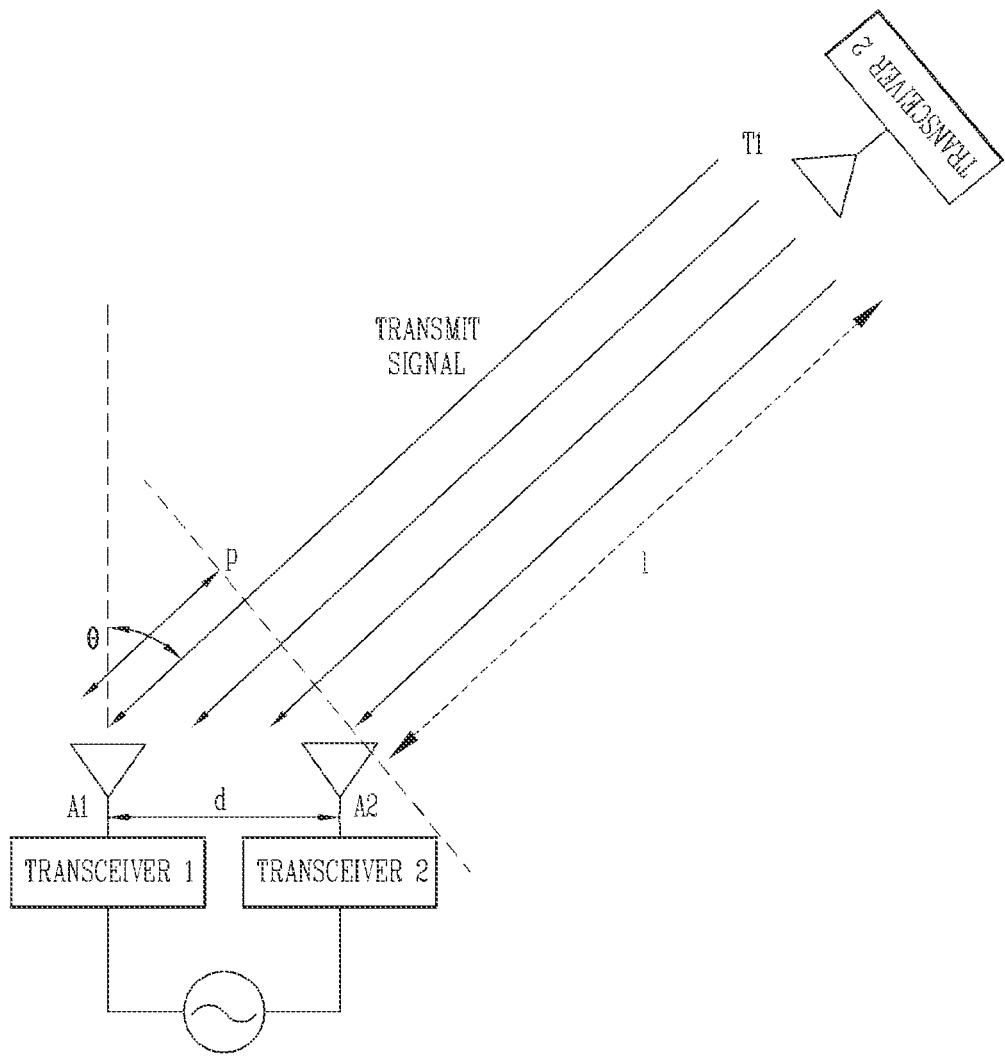
FIG. 5 is a view illustrating the concept of Angle of Arrival (AoA) positioning technology.

Referring to FIG. 5A, the UWB anchor includes antennas A1 and A2 in a first transceiver and a second transceiver, respectively, for receiving UWB signals. The UWB tag T1 transmits the UWB signals through an antenna of a third transceiver (Transmit Signal). Then, the first antenna A1 and the second antenna A2 of the UWB anchor receive the UWB signals.

At this time, if a distance I between the UWB anchor and the UWB tag T1 is longer than a spaced distance d between the first antenna A1 and the second antenna A2 provided in the UWB anchor, an incident shape as shown in FIG. 5A is shown if the transmitted UWB signals are in the form of a plane wave.

Therefore, a distance difference is caused between the UWB signals incident on the first antenna A1 and the second antenna A2. The distance difference corresponds to p in FIG. 5A. An angle formed by a first line connecting the first antenna A1 and the second antenna A2 and a second line orthogonal to the first line is θ. Therefore, the angle θ may be calculated through the following Equation 1.

$$p=d*\sin(\theta)$$

$$\sin(\theta)=p/d \quad \text{[Equation 1]}$$

Meanwhile, the distance between the first antenna A1 or the second antenna A2 and the UWB tag T1 may be measured using two-way ranging. Two-way ranging is a method in which a transmitter and a receiver share their own time information while exchanging signals several times so as to eliminate a time error and thus measure a distance.

When the spaced distance 1 between the first antenna A1 or the second antenna A2 and the UWB tag T1 is known and the angle θ described above is obtained, a relative location of the UWB tag T1 with respect to the first antenna A1 and the second antenna A2 may be determined through the following Equation 2.

$$\alpha/2\pi=p/\theta$$

$$\theta=\sin^{-1}(\alpha*\lambda/2\pi*d) \quad \text{[Equation 2]}$$

Here, α denotes a phase difference between UWB signals received by the first transceiver and the second transceiver provided in the UWB anchor.

As described above, the UWB anchor may transmit and receive signals to and from the UWB tag, thereby determining the relative position of the UWB tag.

Figure 6:
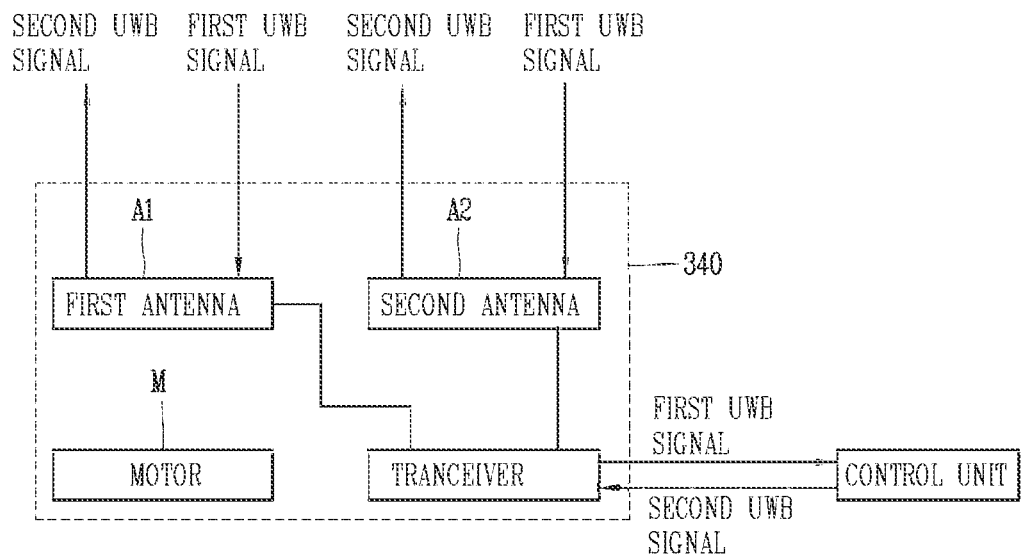
FIG. 6 is a block diagram illustrating a control configuration of a charging station.

Referring to FIG. 6, the charging station 300 may include a communication unit 340 including first and second antennas A1 and A2, a motor M, and a UWB transceiver, and a control unit.

Here, the first and second antennas A1 and A2 may be rotated by the motor M. The first and second antennas A1 and A2 may transfer a received first UWB signal to the UWB transceiver, and transmit a second UWB signal to the moving robot 100.

The first and second antennas A1 and A2 may be arranged on the same line with being spaced apart from each other by a distance d, and may be a directional antenna that transmits and receives the first and second signals at a specific azimuth angle.

That is, the first and second antennas A1 and A2 may facilitate signal transmission and reception with the moving robot 100 located at a remote distance by using a specific azimuth angle with respect to a transmission/reception range of the first and second UWB signals.

The UWB transceiver may transfer the first UWB signal received at at least one of the first and second antennas A1 and A2 to the control unit, and transmit the second UWB signal.

When the first UWB signal is transferred, the control unit may calculate a reception angle θ of the first UWB signal based on a rotation angle of the motor M corresponding to a reception time point of the first UWB signal.

Afterwards, the control unit may confirm a current position of the moving robot 100 based on the reception angle θ, and determine a direction value for the moving robot to return to the charging station based on the current position and a set position of a charging station.

The direction value may be a movement path for the moving robot 100 to return to the position of the charging station, and may include information such as a movement distance and the like. However, the present disclosure is not limited thereto.

When the moving robot 100 moves based on the direction value, the control unit may rotate the motor M according to the direction value and performs transmission and reception of the UWB signals with the moving robot 100.

When the moving robot 100 moves based on the direction value and is then located at a return reference point, which is spaced apart from the position of the charging station, the control unit may transmit a third UWB signal for a heading value of the moving robot 100 to the moving robot 100, for charging of the moving robot 100.

Here, the heading value of the moving robot 100 is a value for determining a direction of a head of the moving robot 100 so that the head of the moving robot 100 can be connected to a correct position of the charging contact unit when docking with the charging station 300, but the present disclosure is not limited to this.

Figure 7A:
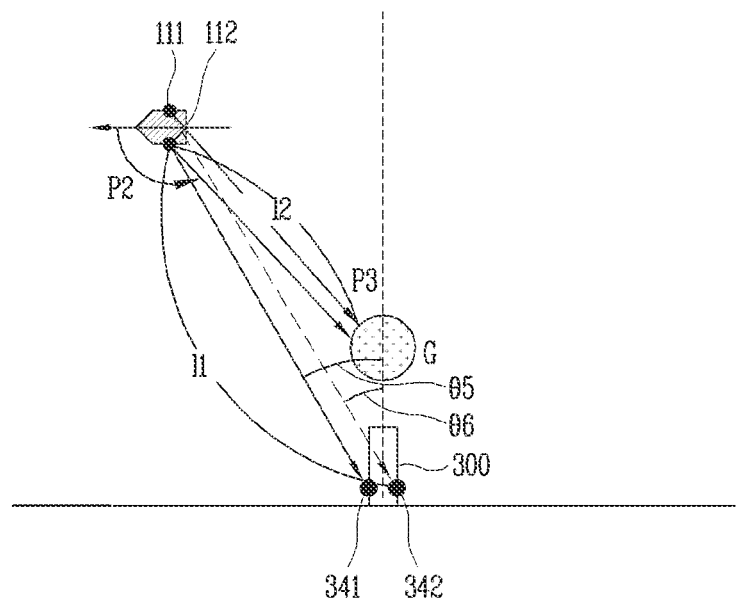
FIGS. 7A and 7B are conceptual views illustrating operations illustrated in FIG. 6 in detail.

Referring to FIG. 7A, when a control command to return to the charging station 300 is output while traveling in one area, the moving robot 100 may transmit the first UWB signal to the charging station 300 through the UWB module 111 disposed on the front of the moving robot 100. The charging station 300 may then transmit the second UWB signal to the moving robot 100 through the first and second antennas 341 and 342.

As for the moving robot 100, the moving robot 100 may move according to the direction value for returning to the charging station 300 based on the second UWB signal.

Thus, the charging station 300 may be said to operate as a UWB anchor. Also, as for the charging station 300, since the position of the moving robot 100 is determined based on the first UWB signal, it may be said that the moving robot 100 operates as a UWB tag and the charging station 300 operates as a UWB anchor.

In this manner, since the moving robot 100 and the charging station 300 can determine their relative positions, the moving robot 100 can rotate the head P2 from its current position toward the point where the charging station is located and move toward the charging station.

Specifically, the control unit of the moving robot 100 may calculate distance information and angle information between the current position of the main body of the moving robot and the charging station 300 based on the second UWB signal transmitted from the charging station 300 according to the output of the control command, and control the traveling unit to rotate the head of the main body toward the point corresponding to the stored coordinates information, namely, the return reference point.

That is, when the first UWB signal is received, the charging station 300 may calculate a reception angle θ and transmit the second UWB signal for the direction value determined according to the reception angle θ.

Here, the direction value may include a movement path I1 along which the moving robot is to move from its current position to the set position of the charging station. In addition, the direction value may include, but is not limited to, a movement path I2 along which the moving robot 100 is to move from its current position to the return reference point G before the position of the charging station.

Figure 7B:
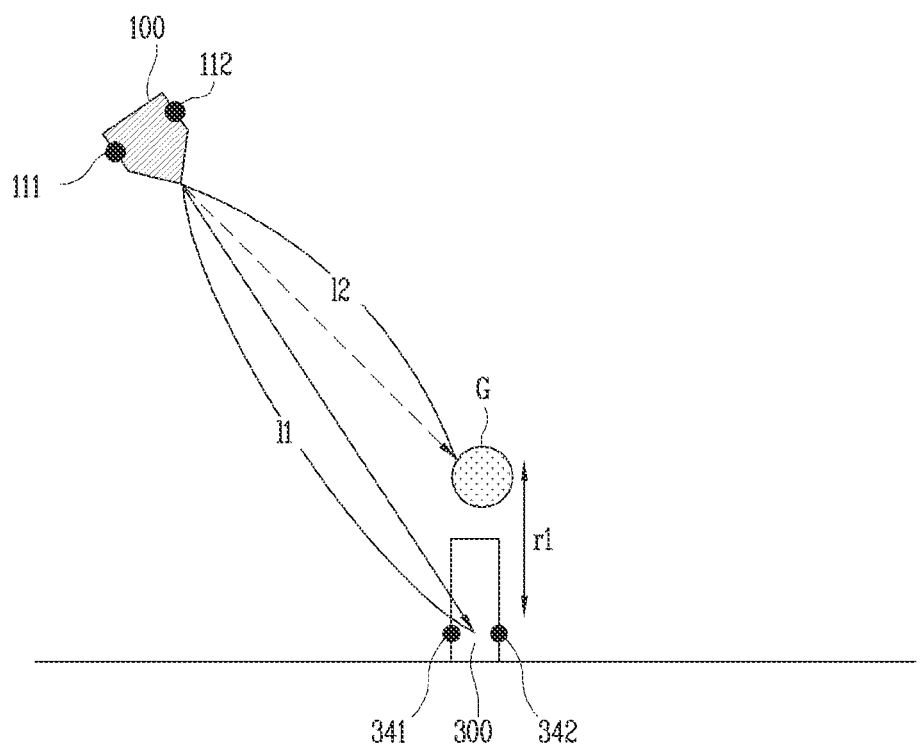

Thereafter, as illustrated in FIG. 7B, the control unit of the moving robot 100 controls the moving robot 100 to move to the return reference point G by rotating the head toward the return reference point G or to move to the position of the charging station.

At this time, in one embodiment, the control unit of the moving robot 100 may check in real time the position of the charging station 300 and the distance l1 from the current position of the moving robot 100 to the charging station 300, while the moving robot moves to the return reference point G. At the same time, the control unit may control the moving robot to travel while checking even the distance l2 from the current position of the moving robot 100 to the return reference point G in real time.

Also, although not shown, when the distance l1 up to the charging station 300 is reduced to be within a reference range, that is, when the moving robot 100 approaches the charging station 300, an LED blinking signal or the like may be output to the charging station 300 and a signal corresponding to this may be transmitted to the moving robot 100.

As such, since the moving robot 100 can find the return reference point G and move with respect to the point, instead of performing a return to the position of the charging station, it may be similarly applied even to the case where the moving robot 100 approaches the charging station 300 from the rear of the charging station 300, unlike the example illustrated in FIGS. 7A and 7B.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid-state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800 of the moving robot. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A station apparatus, comprising:
an Ultra-wideband (UWB) module configured to receive a first UWB signal transmitted by a moving robot; and
a processor operably coupled to the UWB module and configured to calculate a reception angle of the first UWB signal upon reception of the first UWB signal, and control the UWB module to transmit a second UWB signal, including a direction value determined based on the reception angle, to the moving robot for return of the moving robot,
wherein the UWB module comprises:
first and second antennas; and
a motor to rotate the first and second antennas, and
wherein the processor is further configured to:
determine whether the moving robot moves based on the direction value;
transmit the second UWB signal including the direction value to the moving robot through the first and second antennas;
transmit to the moving robot a third UWB signal for finding a return reference point and moving with respect to the return reference point, when the moving robot approaches the charging station from a rear of the charging station;
determine whether the robot moves based on the direction value; and
rotate the motor to transmit and receive signals with the moving robot toward the direction value based on determining that the moving robot moves based on the direction value.

2. The station apparatus of claim 1, wherein the UWB module further comprises:
a UWB transceiver to transfer the first UWB signal received at at least one of the first and second antennas to the control unit, and transmit the second UWB signal.

3. The station apparatus of claim 2, wherein the first antenna is disposed on a same line with the second antenna in a spaced manner.

4. The station apparatus of claim 2, wherein the first and second antennas are directional antennas that transmit and receive the first and second UWB signals only at a preset azimuth angle.

5. The station apparatus of claim 2, wherein the processor is further configured to calculate the reception angle based on a rotation angle of the motor corresponding to a reception time point of the first UWB signal when the first UWB signal is transferred.

6. The station apparatus of claim 2, wherein the direction value is a movement path for the moving robot to return to a station position of the station apparatus.

7. The station apparatus of claim 1, wherein the processor is further configured to:
determine whether the robot moves based on the return reference point; and
rotate the motor to transmit and receive signals with the moving robot toward the return reference point based on determining that the moving robot moves toward the return reference point.

8. The station apparatus of claim 1, wherein the processor is further configured to:
confirm a current position of the moving robot based on the reception angle, and
determine the direction value for the moving robot to return to the station apparatus based on the current position and a set station position of the station apparatus.

9. A moving robot system, comprising:
a moving robot configured to perform autonomous travel; and
a charging station configured to charge the moving robot, wherein the charging station comprises:
an Ultra-wideband (UWB) module configured to receive a first UWB signal transmitted by the moving robot; and
a controller operably coupled to the UWB module and configured to calculate a reception angle of the first UWB signal upon reception of the first UWB signal, and control the UWB module to transmit a second UWB signal, including a direction value determined based on the reception angle, to the moving robot for return of the moving robot,
wherein the moving robot extracts the direction value when the second UWB signal is received after transmitting the first UWB signal, and moves to the charging station based on the direction value,
wherein the UWB module comprises:
first and second antennas; and a motor to rotate the first and second antennas, and
wherein the controller is further configured to:
- determine whether the moving robot moves based on the direction value;
- transmit the second UWB signal including the direction value to the moving robot through the first and second antennas;
- transmit to the moving robot a third UWB signal for finding a return reference point and moving with respect to the return reference point, when the moving robot approaches the charging station from a rear of the charging station;
- determine whether the robot moves based on the direction value; and
- rotate the motor toward the direction value based on determining that the moving robot moves based on the direction value.

* * * * *